(12) United States Patent
Rhee et al.

(10) Patent No.: US 6,233,712 B1
(45) Date of Patent: May 15, 2001

(54) APPARATUS AND METHOD FOR RECOVERING INFORMATION BITS FROM A 64/256-QUADRATURE AMPLITUDE MODULATION TRELISS CODED MODULATION DECODER

(75) Inventors: Dojun Rhee, San Jose, CA (US); Chanthachith Souvanthong, Tourcoing (FR)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/065,751

(22) Filed: Apr. 24, 1998

(51) Int. Cl.$^7$ .......................... H04M 13/23; H04M 13/33
(52) U.S. Cl. ......................... 714/789; 375/265; 714/790; 714/792
(58) Field of Search .................................. 375/262, 265; 714/786, 789, 790, 794, 795, 792

(56) References Cited

U.S. PATENT DOCUMENTS

| | | | |
|---|---|---|---|
| 4,939,734 | * | 7/1990 | Heichler .................................. 371/43 |
| 5,396,518 | * | 3/1995 | How ...................................... 375/265 |
| 5,621,761 | * | 4/1997 | Heegard ................................ 375/265 |
| 5,878,085 | * | 3/1999 | McCallister et al. ................. 375/280 |
| 6,005,897 | * | 12/1999 | McCallister et al. ................. 375/340 |

OTHER PUBLICATIONS

Unknown, "Digital Multi–Programme Systems for Television Sound and Data Services for Cable Distribution", Oct. 1995, International Telecommunication Union (ITU), Recommendation J.83.

Stephen B. Wicker, "The Viterbi Decoding Algorithm", pp. 290–331, 1995, Error Control System for Digital Communication and Storage, Prentice Hall, New Jersey.

* cited by examiner

*Primary Examiner*—Stephen Baker

(57) ABSTRACT

An apparatus for recovering information bits from in-phase and quadrature components of a stream of quadrature amplitude modulation (QAM) trellis code modulation (TCM) signals is disclosed. Each signal has an in-phase component and a quadrature component. The in-phase component includes a decoded bit and a plurality of uncoded in-phase bits and the quadrature component includes a decoded quadrature bit and a plurality of uncoded quadrature bits. The apparatus includes a reencode and puncturing circuitry, an inverse mapping circuitry, and a recovery circuitry. The reencode and puncture circuitry is adapted to receive the in-phase and quadrature components of a QAM TCM signal for encoding the decoded in-phase and quadrature bits. The reencode and puncture circuitry punctures the encoded in-phase bit with the uncoded in-phase bits to generate an in-phase component index. In addition, the reencode and puncture circuitry punctures the encoded quadrature bit with the remaining quadrature bits to generate a quadrature component index. The inverse mapping circuitry is coupled to the reencode and puncture circuitry to receive the in-phase component index and the quadrature component index for recovering a first set of in-phase bits and a second set of quadrature bits. The recovery circuitry is coupled to the inverse mapping circuitry to receive the first set of in-phase bits and the second set of quadrature bits. The recovery circuitry is also coupled to receive the decoded in-phase and quadrature bits. The recovery circuitry recovers a set of information bits by assembling the received bits.

43 Claims, 13 Drawing Sheets

| (I,Q) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | (0,0) | (0,15) | (14,0) | (0,1) | (0,2) | (2,15) | (12,0) | (0,3) | (0,4) | (4,15) | (10,0) | (0,5) | (0,6) | (6,15) | (8,0) | (0,7) |
| 1 | (15,0) | (15,8) | (15,9) | (1,15) | (13,0) | (15,13) | (15,11) | (3,15) | (11,0) | (15,12) | (15,10) | (5,15) | (9,0) | (15,14) | (15,15) | (7,15) |
| 2 | (0,14) | (14,8) | (14,9) | (14,1) | (2,14) | (14,10) | (14,11) | (12,1) | (4,14) | (14,12) | (14,13) | (10,1) | (6,14) | (14,14) | (14,15) | (8,1) |
| 3 | (1,0) | (15,1) | (1,14) | (1,1) | (1,2) | (13,1) | (3,14) | (1,3) | (1,4) | (11,1) | (5,14) | (1,5) | (1,6) | (9,1) | (7,9) | (1,7) |
| 4 | (2,0) | (0,13) | (14,2) | (2,1) | (2,2) | (2,13) | (12,2) | (2,3) | (2,4) | (4,13) | (10,2) | (2,5) | (2,6) | (6,12) | (8,2) | (2,7) |
| 5 | (15,2) | (13,8) | (13,9) | (1,13) | (13,2) | (13,10) | (13,11) | (3,13) | (11,2) | (13,12) | (13,13) | (5,13) | (9,2) | (13,14) | (13,15) | (7,13) |
| 6 | (0,12) | (12,8) | (12,9) | (14,3) | (2,12) | (12,10) | (12,11) | (12,3) | (4,12) | (12,12) | (12,13) | (10,3) | (6,12) | (12,14) | (12,15) | (8,3) |
| 7 | (3,0) | (15,3) | (1,12) | (3,1) | (3,2) | (13,3) | (3,12) | (3,3) | (3,4) | (11,3) | (5,12) | (3,5) | (3,6) | (9,3) | (7,12) | (3,7) |
| 8 | (4,0) | (0,11) | (14,4) | (4,1) | (4,2) | (2,11) | (12,4) | (4,3) | (4,4) | (4,11) | (10,4) | (4,5) | (4,6) | (6,11) | (8,4) | (4,7) |
| 9 | (15,4) | (11,8) | (11,9) | (1,11) | (13,4) | (11,10) | (11,12) | (3,11) | (11,4) | (11,11) | (11,13) | (5,11) | (9,4) | (11,14) | (11,15) | (7,11) |
| 10 | (0,10) | (10,8) | (10,9) | (14,5) | (2,10) | (10,10) | (10,11) | (12,5) | (4,10) | (10,12) | (10,13) | (10,5) | (6,10) | (10,14) | (10,15) | (8,5) |
| 11 | (5,0) | (15,5) | (1,10) | (5,1) | (5,2) | (13,5) | (3,10) | (5,3) | (5,4) | (11,5) | (5,10) | (5,5) | (5,6) | (9,5) | (7,10) | (5,7) |
| 12 | (6,0) | (0,9) | (14,6) | (6,1) | (6,2) | (2,9) | (12,6) | (6,3) | (6,4) | (4,9) | (10,6) | (6,5) | (6,6) | (6,9) | (8,6) | (6,7) |
| 13 | (15,6) | (9,8) | (9,9) | (1,9) | (13,6) | (9,10) | (9,11) | (3,9) | (11,6) | (9,12) | (9,13) | (5,9) | (9,6) | (9,14) | (9,15) | (7,9) |
| 14 | (0,8) | (8,8) | (8,9) | (14,7) | (2,8) | (8,10) | (8,11) | (12,7) | (4,8) | (8,12) | (8,13) | (10,7) | (6,8) | (8,14) | (8,15) | (8,7) |
| 15 | (7,0) | (15,7) | (1,8) | (7,1) | (7,2) | (13,7) | (3,8) | (7,3) | (7,4) | (11,7) | (5,8) | (7,5) | (7,6) | (9,7) | (7,8) | (7,7) |

Fig. 3B
(Prior Art)

| (X,Y) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 1,1 | 1,3 | 1,5 | 1,7 | 1,9 | 1,11 | 1,13 | 1,15 | 1,-15 | 1,-13 | 1,-11 | 1,-9 | 1,-7 | 1,-5 | 1,-3 | 1,-1 |
| 1 | 3,1 | 3,3 | 3,5 | 3,7 | 3,9 | 3,11 | 3,13 | 3,15 | 3,-15 | 3,-13 | 3,-11 | 3,-9 | 3,-7 | 3,-5 | 3,-3 | 3,-1 |
| 2 | 5,1 | 5,3 | 5,5 | 5,7 | 5,9 | 5,11 | 5,13 | 5,15 | 5,-15 | 5,-13 | 5,-11 | 5,-9 | 5,-7 | 5,-5 | 5,-3 | 5,-1 |
| 3 | 7,1 | 7,3 | 7,5 | 7,7 | 7,9 | 7,11 | 7,13 | 7,15 | 7,-15 | 7,-13 | 7,-11 | 7,-9 | 7,-7 | 7,-5 | 7,-3 | 7,-1 |
| 4 | 9,1 | 9,3 | 9,5 | 9,7 | 9,9 | 9,11 | 9,13 | 9,15 | 9,-15 | 9,-13 | 9,-11 | 9,-9 | 9,-7 | 9,-5 | 9,-3 | 9,-1 |
| 5 | 11,1 | 11,3 | 11,5 | 11,7 | 11,9 | 11,11 | 11,13 | 11,15 | 11,-15 | 11,-13 | 11,-11 | 11,-9 | 11,-7 | 11,-5 | 11,-3 | 11,-1 |
| 6 | 13,1 | 13,3 | 13,5 | 13,7 | 13,9 | 13,11 | 13,13 | 13,15 | 13,-15 | 13,-13 | 13,-11 | 13,-9 | 13,-7 | 13,-5 | 13,-3 | 13,-1 |
| 7 | 15,1 | 15,3 | 15,5 | 15,7 | 15,9 | 15,11 | 15,13 | 15,15 | 15,-15 | 15,-13 | 15,-11 | 15,-9 | 15,-7 | 15,-5 | 15,-3 | 15,-1 |
| 8 | -15,1 | -15,3 | -15,5 | -15,7 | -15,9 | -15,11 | -15,13 | -15,15 | -15,-15 | -15,-13 | -15,-11 | -15,-9 | -15,-7 | -15,-5 | -15,-3 | -15,-1 |
| 9 | -13,1 | -13,3 | -13,5 | -13,7 | -13,9 | -13,11 | -13,13 | -13,15 | -13,-15 | -13,-13 | -13,-11 | -13,-9 | -13,-7 | -13,-5 | -13,-3 | -13,-1 |
| 10 | -11,1 | -11,3 | -11,5 | -11,7 | -11,9 | -11,11 | -11,13 | -11,15 | -11,-15 | -11,-13 | -11,-11 | -11,-9 | -11,-7 | -11,-5 | -11,-3 | -11,-1 |
| 11 | -9,1 | -9,3 | -9,5 | -9,7 | -9,9 | -9,11 | -9,13 | -9,15 | -9,-15 | -9,-13 | -9,-11 | -9,-9 | -9,-7 | -9,-5 | -9,-3 | -9,-1 |
| 12 | -7,1 | -7,3 | -7,5 | -7,7 | -7,9 | -7,11 | -7,13 | -7,15 | -7,-15 | -7,-13 | -7,-11 | -7,-9 | -7,-7 | -7,-5 | -7,-3 | -7,-1 |
| 13 | -5,1 | -5,3 | -5,5 | -5,7 | -5,9 | -5,11 | -5,13 | -5,15 | -5,-15 | -5,-13 | -5,-11 | -5,-9 | -5,-7 | -5,-5 | -5,-3 | -5,-1 |
| 14 | -3,1 | -3,3 | -3,5 | -3,7 | -3,9 | -3,11 | -3,13 | -3,15 | -3,-15 | -3,-13 | -3,-11 | -3,-9 | -3,-7 | -3,-5 | -3,-3 | -3,-1 |
| 15 | -1,1 | -1,3 | -1,5 | -1,7 | -1,9 | -1,11 | -1,13 | -1,15 | -1,-15 | -1,-13 | -1,-11 | -1,-9 | -1,-7 | -1,-5 | -1,-3 | -1,-1 |

Fig. 3C
(Prior Art)

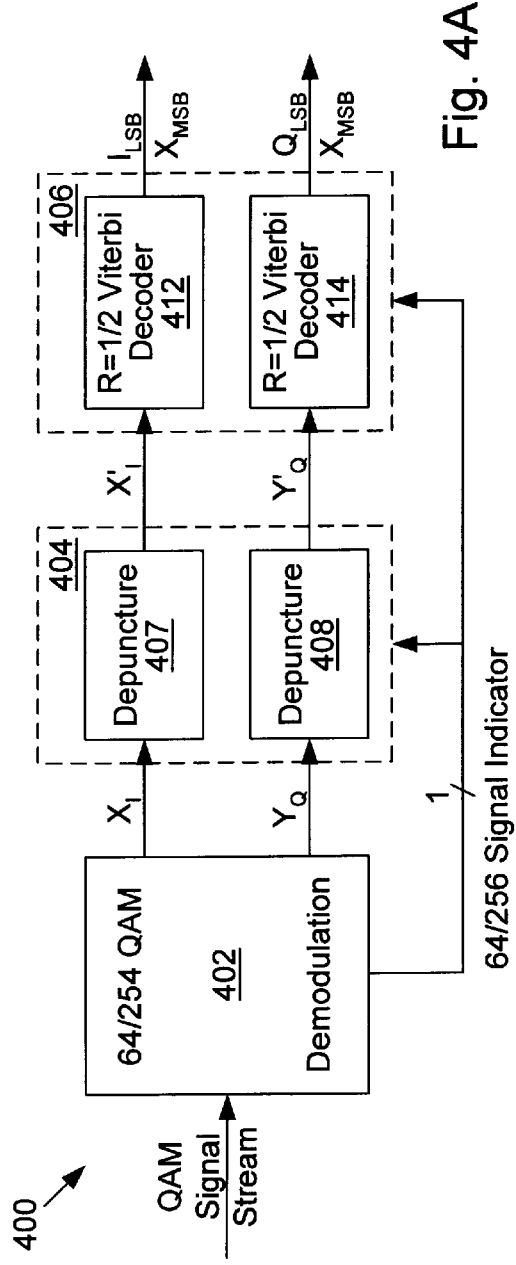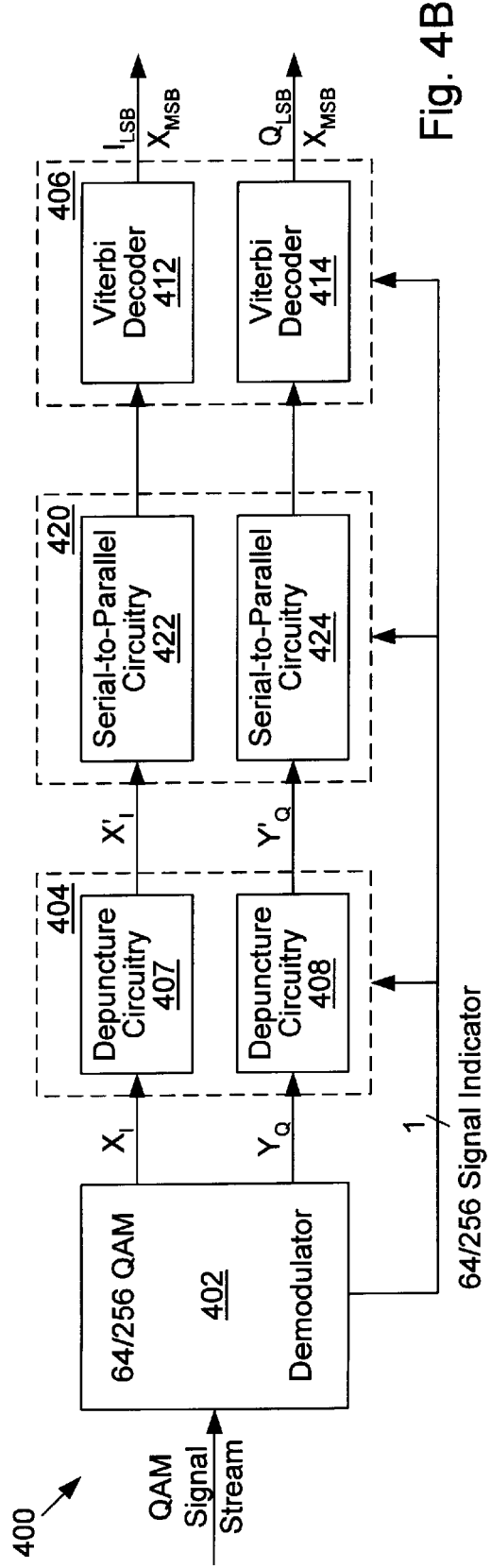

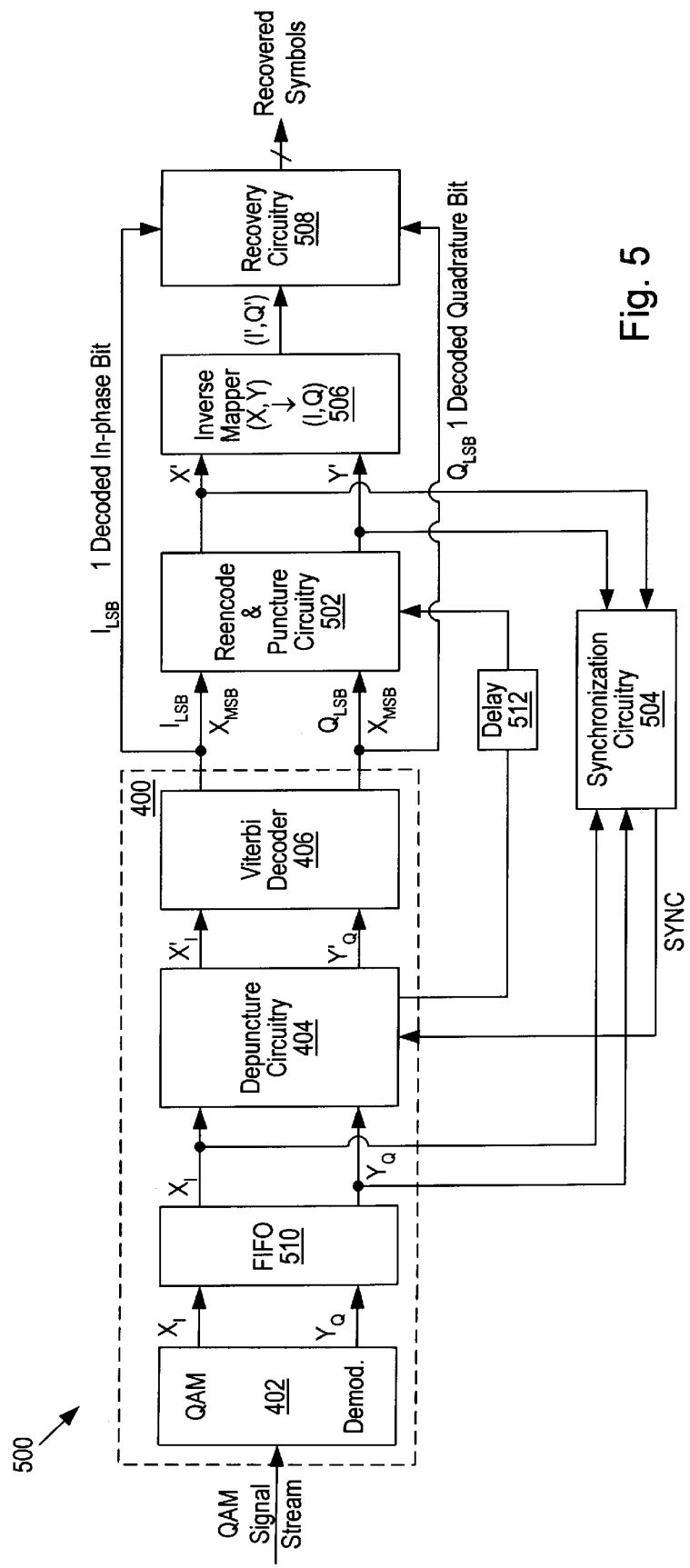

| (X,Y) | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0,0 | 0,3 | 0,4 | 0,7 | 0,8 | 0,11 | 0,12 | 0,15 | 14,0 | 12,1 | 10,0 | 8,1 | 6,0 | 4,1 | 2,0 | 0,1 |
| 1 | 3,0 | 3,3 | 3,4 | 3,7 | 3,8 | 3,11 | 3,12 | 3,15 | 15,2 | 13,3 | 11,2 | 9,3 | 7,2 | 5,3 | 3,2 | 1,3 |
| 2 | 4,0 | 4,3 | 4,4 | 4,7 | 4,8 | 4,11 | 4,12 | 4,15 | 14,4 | 12,5 | 10,4 | 8,5 | 6,4 | 4,5 | 2,4 | 0,5 |
| 3 | 7,0 | 7,3 | 7,4 | 7,7 | 7,8 | 7,11 | 7,12 | 7,15 | 15,6 | 13,7 | 11,6 | 9,7 | 7,6 | 5,7 | 3,6 | 1,7 |
| 4 | 8,0 | 8,3 | 8,4 | 8,7 | 8,8 | 8,11 | 8,12 | 8,15 | 14,8 | 12,9 | 10,8 | 8,9 | 6,8 | 4,9 | 2,8 | 0,9 |
| 5 | 11,0 | 11,3 | 11,4 | 11,7 | 11,8 | 11,11 | 11,12 | 11,15 | 15,10 | 13,11 | 11,10 | 9,11 | 7,10 | 5,11 | 3,10 | 1,11 |
| 6 | 12,0 | 12,3 | 12,4 | 12,7 | 12,8 | 12,11 | 12,12 | 12,15 | 14,12 | 12,13 | 10,12 | 8,13 | 6,12 | 4,13 | 2,12 | 0,13 |
| 7 | 15,0 | 15,3 | 15,4 | 15,7 | 15,8 | 15,11 | 15,12 | 15,15 | 15,14 | 13,15 | 11,14 | 9,15 | 7,14 | 5,15 | 3,14 | 1,15 |
| 8 | 0,14 | 2,15 | 4,14 | 6,15 | 8,14 | 10,15 | 12,14 | 14,15 | 14,14 | 14,13 | 14,10 | 14,9 | 14,6 | 14,5 | 14,2 | 14,1 |
| 9 | 1,12 | 3,13 | 5,12 | 7,13 | 9,12 | 11,13 | 13,12 | 15,13 | 13,14 | 13,13 | 13,10 | 13,9 | 13,6 | 13,5 | 13,2 | 13,1 |
| 10 | 0,10 | 2,11 | 4,10 | 6,11 | 8,10 | 10,11 | 12,10 | 14,11 | 10,14 | 10,13 | 10,10 | 10,9 | 10,6 | 10,5 | 10,2 | 10,1 |
| 11 | 1,8 | 3,9 | 5,8 | 7,9 | 9,8 | 11,9 | 13,8 | 15,9 | 9,14 | 9,13 | 9,10 | 9,9 | 9,6 | 9,5 | 9,2 | 9,1 |
| 12 | 0,6 | 2,7 | 4,6 | 6,7 | 8,6 | 10,7 | 12,6 | 14,7 | 6,14 | 6,13 | 6,10 | 6,9 | 6,6 | 6,5 | 6,2 | 6,1 |
| 13 | 1,4 | 3,5 | 5,4 | 7,5 | 9,4 | 11,5 | 13,4 | 15,5 | 5,14 | 5,13 | 5,10 | 5,9 | 5,6 | 5,5 | 5,2 | 5,1 |
| 14 | 0,2 | 2,3 | 4,2 | 6,3 | 8,2 | 10,3 | 12,2 | 14,3 | 2,14 | 2,13 | 2,10 | 2,9 | 2,6 | 2,5 | 2,2 | 2,1 |
| 15 | 1,0 | 3,1 | 5,0 | 7,1 | 9,0 | 11,1 | 13,0 | 15,1 | 1,14 | 1,13 | 1,10 | 1,9 | 1,6 | 1,5 | 1,2 | 1,1 |

$(X,Y) \rightarrow (I,Q)$

APPARATUS AND METHOD FOR RECOVERING INFORMATION BITS FROM A 64/256-QUADRATURE AMPLITUDE MODULATION TRELISS CODED MODULATION DECODER

CROSS REFERENCE TO RELATED APPLICATIONS

The present application is related to U.S. patent application having Ser. No. 09,066,048 filed on the same day herewith, entitled "A 64/256 QUADRATURE AMPLITUDE MODULATION TRELLIS CODED MODULATOR DECODER," by inventors Dojun Rhee and Chanthachith Souvanthong, assigned to the assignee of the present application and is incorporated herein by reference in its entirety.

FIELD OF THE INVENTION

The present claimed invention relates to cable modems. More particularly, the present claimed invention relates to recovering information bits from quadrature amplitude modulation trellis coded modulation decoders.

BACKGROUND ART

Originally, cable networks were established to provide TV signals to a community that otherwise could not receive reliable TV signals. With subsequent addition of more channels, cable TVs have gained enormous popularity in the general segment as well. With the advent of the Internet and other digital communications, however, cable networks and channels have become a focus for transmitting digitized information at high speed and bandwidth. This is because a cable network can provide a high speed digital communication channel in addition to well known traditional cable services.

In cable networks, cable modems provide high speed data transporting functions between a cable network and a connected user. Cable modems typically implement a forward error correction (FEC) scheme. Prior Art FIG. 1 illustrates a conventional cable modem transmission block diagram 100 depicting an FEC scheme that complies with the standard of ITU-T Recommendation J-83 Annex B. The ITU-T Recommendation J-83 Annex B specifies using 64- and 256-quadrature amplitude modulation (QAM). The cable transmission block diagram 100 includes an FEC encoder 102, an FEC decoder 104, and a cable channel 106. The FEC encoder 102 encodes data using conventional FEC schemes for transmission to the FEC decoder 104 through the cable channel 106.

The FEC encoder 102 includes a Reed Solomon (RS) encoder 108, a convolutional interleaver 110, a randomizer 112 (e.g., scrambler), and a Trellis coded modulation (TCM) encoder 114. The RS encoder 108 sequentially receives 122 byte (i.e., symbol) packets with each byte containing 7 bits. Each packet contains 122 7-bit symbols or bytes. The RS encoder 108 adds six 7-bit redundancy bytes for correcting up to 3 symbol errors. The RS encoded 128 7-bit symbol packets are then transmitted to the interleaver 110 for convolutionally interleaving the symbols by modifying the order of the symbols in a packet. Convolutional interleaving is designed to reduce burst mode errors.

The interleaver 110 sequentially transmits the RS encoded and interleaved 128 7-bit symbol packets to the randomizer 112. The randomizer 112 adds a pseudorandom noise sequence of 7 bit symbols by performing bit-wise exclusive-OR operations to the symbols in an FEC frame (e.g., packet) to assure a random transmitted sequence. As used herein, an FEC frame refers to a packet that is processed in sequential fashion in the FEC encoder 102 and FEC decoder 104. The randomizer 112 thus provides even distribution of symbols in the constellation (e.g., 64 QAM, 256 QAM) to enable the modem to maintain proper phase lock during the transmission of data.

The randomized data packets, each of which includes 128 7-bit symbols, are then serially transmitted to the TCM encoder 114. As will be discussed below, the TCM encoder 114 adds redundancy to the data to improve the signal-to-noise ratio by increasing the symbol constellation without increasing the symbol rate. The TCM encoded data is then sent to the FEC decoder 104 over the cable channel 106. The conventional FEC encoder 102 including the RS encoder 108, the interleaver 110, the randomizer 112, and the TCM encoder 114 is known in the art and is described, for example, in a standard recommended by ITU-T (International Telecommunication Union) Recommendation J.83 entitled "Digital Multi-Programme Systems for Television Sound and Data Services for Cable Distribution," which is incorporated herein by reference in its entirety. For example, the ITU-T Recommendation J.83 specifies a single chip 64/256-QAM TCM encoder, which may be used to encode the inner code for a concatenated decoding scheme of North American cable modem.

The FEC decoder 104 includes a TCM decoder 116, a de-randomizer 118, a convolutional de-interleaver 120, and an RS decoder 122. The TCM decoder 116 receives the data serially from the FEC encoder 102 via the cable channel 106 and decodes the TCM encoded data. The TCM decoded data is then transmitted to the de-randomizer 118 and de-randomizes the symbols in the 128 7-bit symbol packets. After de-randomizing, the convolutional de-interleaver 120 receives the de-randomized data and de-interleaves the symbols in the 128 7-bit symbol packets. The de-interleaver 120 then transmits the de-interleaved data to the RS decoder 116.

The RS decoder 116 decodes the received data by performing RS error detection and correction on the received data. This RS decoding removes the 6 7-bit redundancy symbols added by the RS encoder 108 and thereby generates the original MPEG framed data of 122 7-bit symbol or byte packets as output.

The concatenated FEC coding scheme described in the ITU-T standard employs trellis coding for the inner code. The use of the trellis coding introduces redundancy to improve the signal-to-noise ratio by increasing the symbol constellation without increasing the symbol rate. Such coding is referred to as "trellis coded modulation" or "TCM" for short.

Prior Art FIG. 2A illustrates a block diagram of a conventional TCM encoder 114. The TCM encoder 114 of Prior Art FIG. 2 is a 64-QAM TCM encoder, which encodes a group of four RS encoded symbols into five consecutive 64-QAM symbols for mapping into five consecutive 64 QAM signals. The 64-QAM TCM encoder 114 serially receives 128 7-bit FEC frames (e.g., packets). A parser 202 identifies a group of four 7-bit symbols as RS1, RS2, RS3, and RS4 and assigns the symbols RS1 and RS2 as in-phase "I" component and assigns the symbols RS3 and RS4 as quadrature "Q" component. The symbol RS1 includes seven bits $I_0$, $I_1$, $I_2$, $I_3$, $I_4$,$I_5$, and $I_6$; the symbol RS2 includes bits $I_7$, $I_8$, $I_9$, $I_{10}$, $I_{11}$, $I_{12}$, and $I_{13}$; RS3 includes 7 bits $Q_0$, $Q_1$, $Q_2$, $Q_3$, $Q_4$, $Q_5$, and $Q_6$; and RS4 includes bits $Q_7$, $Q_8$, $Q_9$, $Q_{10}$, $Q_{11}$, $Q_{12}$, and $Q_{13}$. Since each symbol contains 7 bits, the total number of input bits for the four symbols is 28 bits with 14 bits each for I and Q symbols.

In this parsing scheme, the parser 202 assigns the individual bits of the I and Q symbols RS symbols into two groups as follows: two upper or most significant uncoded bit streams 212 and 214 and one lower or least significant bit coded bit stream 206 and 208. For the I component, the parser 202 outputs two upper uncoded bit streams 212: one stream including bits $I_1$, $I_4$, $I_7$, $I_{10}$, and $I_{12}$, and the other stream including bits $I_2$, $I_5$, $I_8$, $I_{11}$, and $I_{13}$. For the lower coded bit stream 216 of the I component, the parser 202 outputs the bits $I_0$, $I_3$, $I_6$, and $I_9$ for transmission to a differential encoder 204.

Likewise, for the Q component, the parser 202 outputs two upper uncoded bit streams 214: one stream including bits $Q_1$, $Q_4$, $Q_7$, $Q_{10}$, and $Q_{12}$, and the other stream including bits $Q_2$, $Q_5$, $Q_8$, $Q_{11}$, and $Q_{13}$. For the lower coded bit stream 218 of the Q component, the parser 202 outputs the bits $Q_0$, $Q_3$, $Q_6$, and $Q_9$ for transmission to the differential encoder 204. The two upper uncoded bit streams 212 and 214 of I and Q components are transmitted to a 64-QAM mapper 210.

With reference still to Prior Art FIG. 2A, the differential encoder 204 receives the lower streams 216 and 218 of I and Q components in sequence and performs a 90 degree rotationally invariant trellis coding for each corresponding pair of I and Q bits as received. Specifically, the differential encoder 204 performs the rotationally invariant trellis coding for the I and Q bit pairs as they are received as follows: $I_0$ and $Q_0$, $I_3$ and $Q_3$, $I_6$ and $Q_6$, and $I_9$ and $Q_9$. This allows the information to be carried by the change in phase, rather than by the absolute phase. The differential encoder 204 then transmits the differentially encoded lower stream I and Q components to a pair of punctured binary convolutional encoders 206 and 208, respectively.

The punctured binary convolutional encoders 206 and 208 are rate ½ binary convolutional encoders and convolutionally encodes redundancy into the least significant bits of the I and Q symbols to improve signal-to-noise gain. The convolutional encoders 206 and 208 are 16-state non-systematic ½ rate encoders with the generator: G1=010 101 and G2=011 111 (25, 37) octal. This generator is equivalent to the generator matrix $[1 \oplus D^2 \oplus D^4, 1 \oplus D \oplus D^2 \oplus D^3 \oplus D^4]$, where D represents a delay element "$Z^{-1}$." The ½ rate encoder generates 8 output bits from the four input bits for each lower I and Q component streams 216 and 218.

The 8 output bits are fed into a puncture matrix: 0001 1111, where "0" denotes NO transmission and "1" represents transmission of the output signal. The puncture matrix essentially converts the rate ½ encoder to rate ⅘ to produce a single serial bit stream of 5 bits. Accordingly, the punctured binary convolutional encoders 206 and 208 encodes the 4 bits of the lower I and Q bit streams 216 and 218, respectively, to generate 5 coded bits of $I_0'$, $I_1'$, $I_2'$, $I_3'$, and $I_4'$ as the convolutionally encoded lower I stream 220 and 5 coded bits of $Q_0'$, $Q_1'$, $Q_2'$, $Q_3'$, and $Q_4'$ as the convolutionally encoded lower Q stream 222. Since the TCM encoder 114 encodes a trellis group of 28 input bits to generate 30 bits, the overall trellis coded modulation of the 64-QAM TCM encoder 114 yields a 28/30 rate.

The 64 QAM mapper 210 receives two upper streams 212 and 214 and one lower streams of the I and Q components for a total of six streams. Each of the streams includes 5 serial data bits. Since I and Q includes 3 data streams, both I and Q streams can be used to define 3 bits of data at any one time. For example, the bits $I_0'$, $I_1$, and $I_2$ define an I component while the bits $Q_0'$, $Q_1$, and $Q_2$ define a Q component.

The 3 bits of I and Q components can then used in a double mapping process to generate a QAM signal. Specifically, using the 3 bits of I and Q components as indices to a look-up table, the 64-QAM mapper 210 determines a QAM symbol defined by "X" and "Y" components. Each of the "X" and "Y" components is 3 bits and represent 8-PAM signal constellation. Prior Art FIG. 2B illustrates a 64-QAM table that can be used to generate the X and Y values. The TCM encoder 114 may also include a QAM constellation mapper to generate a QAM signal. That is, the QAM constellation mapper can use the X and Y components as indices to a 64 QAM constellation mapping table to generate a corresponding QAM signal. Prior Art FIG. 2C depicts a 64-QAM constellation mapping table. Given the five consecutive bits in each of the streams 212, 214, 220, and 222 of the I and Q components, this double mapping process generates 5 consecutive QAM signals corresponding to the 5 consecutive QAM symbols.

In addition to the 64-QAM encoding, the ITU-T Recommendation also specifies utilizing a 256-QAM encoding in the cable modem specification. Prior Art FIG. 3A illustrates a block diagram of a conventional 256-QAM TCM encoder 300. Unlike the 64-QAM TCM encoder, which encodes 4 symbols of 28 bits, the 256-QAM TCM encoder 300 encodes a trellis group of 38 bits into five consecutive 256-QAM symbols for mapping into five consecutive 64 QAM signals. The 256-QAM TCM encoder encodes the 38 input bits into 5 consecutive QAM symbols and signals.

The 256-QAM TCM encoder 300 serially receives 128 7-bit FEC frames (e.g., packets). A parser 302 identifies a trellis group of 38 bits and assigns 19 bits as in-phase "I" component and the remaining 19 bits as quadrature "Q" component. The trellis group of 38 bits may either be in a non-sync trellis group bit order as indicated in row 304 or a sync trellis group bit order as indicated in row 306. To form a trellis group from RS codeword symbols, the parser 302 serializes the RS symbol bits beginning with the most significant bits of the first symbol of the first RS codeword following the frame sync. Bits are then placed in trellis group locations from RS symbols in the order as indicated in rows 304 or 306. For the sync trellis group, RS bits begin at location $I_1$ instead of $I_0$.

In this parsing scheme, the parser 302 assigns the individual bits of the I and Q symbols RS symbols into two groups as follows: three upper or most significant uncoded bit streams 308 and 310 and one lower or least significant bit coded bit stream 312 and 314. For the I component, the parser 302 outputs three upper uncoded bit streams 308: one stream including bits $I_3$, $I_7$, $I_{11}$, $I_{15}$, and $I_{18}$, another stream including bits $I_2$, $I_6$, $I_{10}$, $I_{14}$, and $I_{17}$, and the remaining stream including bits $I_1$, $I_5$, $I_9$, $I_{13}$, and $I_{16}$. For the lower coded bit stream 312 of the I component, the parser 302 outputs the bits $I_0$, $I_4$, $I_8$, and $I_{12}$ for transmission to a differential encoder 316. In case of the sync trellis group, the lower coded I component bit stream 312 includes $S_0$, $S_2$, $S_4$, and $S_6$.

Similarly for the Q component, the parser 302 outputs three upper uncoded bit streams 310: one stream including bits $Q_3$, $Q_7$, $Q_{11}$, $Q_{15}$, and $Q_{18}$, another stream including bits $Q_2$, $Q_6$, $Q_{10}$, $Q_{14}$, and $Q_{17}$, and the remaining stream including bits $Q_1$, $Q_5$, $Q_9$, $Q_{13}$, and $Q_{16}$. For the lower coded bit stream 314 of the Q component, the parser 302 outputs the bits $Q_0$, $Q4$, $Q_8$, and $Q_{12}$ for transmission to the differential encoder 316. In the case of the sync trellis group, the lower coded Q component bit stream 314 includes bits $S_1$, $S_3$, $S_5$, and $S_7$. The three upper uncoded bit streams 308 and 310 of I and Q components are transmitted to a 256-QAM mapper 318.

With reference still to Prior Art FIG. 3A, the differential encoder 316 receives the lower streams 312 and 314 of I and Q components in sequence and performs a 90 degree rotationally invariant trellis coding for each corresponding pair of I and Q bits as received. Specifically, the differential encoder 316 performs the rotationally invariant trellis coding for the I and Q bit pairs as they are received as follows: $I_0$ and $Q_0$, $I_4$ and $Q_4$, $I_8$ and $Q_8$, and $I_{12}$ and $Q_{12}$ for a non-sync trellis group bit order and $S_0$ and $S_1$, $S_2$ and $S_3$, $S_4$ and $S_5$, and $S_6$ and $S_7$ for a sync trellis group bit order. This allows the information to be carried by the change in phase, rather than by the absolute phase. The differential encoder 316 then transmits the differentially encoded lower stream I and Q components to a pair of punctured binary convolutional encoders 320 and 322, respectively.

The punctured binary convolutional encoders 320 and 322 are rate ½ binary convolutional encoders and convolutionally encodes redundancy into the least significant bits of the I and Q symbols to improve signal-to-noise gain. The convolutional encoders 320 and 322 are 16-state non-systematic ½ rate encoders with the generator: G1=010 101 and G2=011 111 (25, 37) octal. This generator is equivalent to the generator matrix $[1 \oplus D^2 \oplus D^4, 1 \oplus D \oplus D^2 \oplus D^3 \oplus D^4]$, where D represents a delay element "$Z^{-1}$." The ½ rate encoder generates 8 output bits from the four input bits for each I and Q component streams 312 and 314.

The 8 output bits are then fed into a puncture matrix: 0001 1111, where "0" denotes NO transmission and "1" represents transmission of the output signal. The puncture matrix essentially converts the rate ½ encoder to rate ⅘ to produce a single serial bit stream of 5 bits. Accordingly, the punctured binary convolutional encoders 320 and 322 encodes the 4 bits of the lower I and Q bit streams 216 and 218, respectively, to generate 5 coded bits of $I_0'$, $I_1'$, $I_2'$, $I_3'$, and $I_4'$ as the convolutionally encoded lower I stream 324 and 5 coded bits of $Q_0'$, $Q_1'$, $Q_2'$, $Q_3'$, and $Q_4'$ as the convolutionally encoded lower Q stream 326. Since the TCM encoder 300 encodes a trellis group of 38 input bits to generate 40 bits, the overall trellis coded modulation of the 256-QAM TCM encoder 300 yields a 38/40 rate.

The 256 QAM mapper 318 receives three upper streams 308 and 310 and the lower streams 324 and 326 of the I and Q components for a total of six streams. Each of the streams includes 5 serial data bits. Since I and Q each includes 4 data streams, both I and Q streams can be used to define 4 bits of data at any one time. For example, the bits $I_0'$, $I_1$, $I_2$, and $I_3$ define an I component while the bits $Q_0'$, $Q_1$, $Q_2$, and $Q_3$ define a Q component.

The 4 bits of I and Q components can then used in a double mapping process to generate a QAM signal. Specifically, using the 4 bits of I and Q components as indices to a look-up table, the 256-QAM mapper 318 determines an 8-bit QAM symbol defined by "X" and "Y" components. Each of the "X" and "Y" components is 4 bits and represents 16-PAM signal constellation. Prior Art FIG. 3B illustrates a 256-QAM table that can be used to generate the X and Y values. The TCM encoder 300 may also include a QAM constellation mapper 328 to generate a QAM signal. That is, the QAM constellation mapper 328 can use the X and Y components as indices to a 256 QAM constellation mapping table to generate a corresponding QAM signal. Prior Art FIG. 3C depicts a 256-QAM constellation mapping table. Given the five consecutive bits in each of the streams 308, 310, 324, and 326 of the I and Q components, this double mapping process generates 5 consecutive QAM signals corresponding to the 5 consecutive 8-bit QAM symbols.

Conventional techniques and apparatus for decoding the 64/256-QAM TCM encoded data stream would typically require direct product of two 8-state trellis and two 16-state trellis for 64- and 256-QAM TCM encoded data, respectively. This is because both the quadrature and in-phase components of demodulated 64/256-QAM signals are needed to compute the squared Euclidian distance. Hence, the conventional technique and apparatus requires the use of a heavily connected 64 or 256-state trellis, resulting in complex trellis and branch metric processing.

Thus, what is needed is an apparatus and method for recovering information bits from the 64/256-QAM TCM encoded data stream using less trellis and branch metrics.

SUMMARY OF THE INVENTION

Broadly speaking, the present invention fills these needs by providing apparatus and method for recovering information bits from a 64/256-QAM TCM decoder. It should be appreciated that the present invention can be implemented in numerous ways, including as a process, an apparatus, a system, a device, or a method. Several inventive embodiments of the present invention are described below.

In one embodiment, the present invention provides an apparatus for recovering information bits from in-phase and quadrature components of a stream of quadrature amplitude modulation (QAM) trellis code modulation (TCM) signals. Each signal has an in-phase component and a quadrature component. The in-phase component includes a decoded bit and a plurality of uncoded in-phase bits and the quadrature component includes a decoded quadrature bit and a plurality of uncoded quadrature bits. The apparatus includes a reencode and puncturing circuitry, an inverse mapping circuitry, and a recovery circuitry. The reencode and puncture circuitry is adapted to receive the in-phase and quadrature components of a QAM TCM signal for encoding the decoded in-phase and quadrature bits. The reencode and puncture circuitry punctures the encoded in-phase bit with the uncoded in-phase bits to generate an in-phase component index. In addition, the reencode and puncture circuitry punctures the encoded quadrature bit with the remaining quadrature bits to generate a quadrature component index. The inverse mapping circuitry is coupled to the reencode and puncture circuitry to receive the in-phase component index and the quadrature component index for recovering a first set of in-phase bits and a second set of quadrature bits. The recovery circuitry is coupled to the inverse mapping circuitry to receive the first set of in-phase bits and the second set of quadrature bits. The recovery circuitry is also coupled to receive the decoded in-phase and quadrature bits. The recovery circuitry recovers a set of information bits by assembling the received bits.

In another embodiment, the present invention provides a method for recovering information bits from in-phase and quadrature components of a stream of QAM TCM signals. Each signal has an in-phase component and a quadrature component. The in-phase component includes a decoded bit and a plurality of uncoded in-phase bits and the quadrature component includes a decoded quadrature bit and a plurality of uncoded quadrature bits. The method includes: a) receiving the in-phase and quadrature components of a QAM TCM signal; b) encoding the decoded in-phase and quadrature bits of the in-phase and quadrature components, respectively; c) puncturing the encoded in-phase bit with the uncoded in-phase bits to generate an in-phase component index and puncturing the encoded quadrature bit with the remaining quadrature bits to generate a quadrature component index; d)

recovering a first set of in-phase bits and a second set of quadrature bits using the in-phase component index and the quadrature component index; and e) recovering a set of information bits by assembling the first set of in-phase bits, the second set of quadrature bits, and the decoded in-phase and quadrature bits.

In yet another embodiment, the present invention provides an apparatus for recovering information bits from in-phase and quadrature components of a stream of QAM TCM signals. Each signal has an in-phase component and a quadrature component. The in-phase component includes a decoded bit and a plurality of uncoded in-phase bits and the quadrature component includes a decoded quadrature bit and a plurality of uncoded quadrature bits. The apparatus includes a re-encoding and puncturing means, a mapping means, and a recovering means. The re-encoding and puncturing means encodes the decoded in-phase and quadrature bits. Then, the reencode and puncture means punctures the encoded in-phase bit with the uncoded in-phase bits to generate an in-phase component index. In addition, the reencode and puncture means punctures the encoded least significant quadrature bit with the remaining quadrature bits to generate a quadrature component index. The mapping means recovers a first set of in-phase bits and a second set of quadrature bits from the in-phase component index and the quadrature component index, respectively. The recovering means recovers a set of information bits by assembling the first set of in-phase bits and the second set of quadrature bits and the decoded in-phase and quadrature bits.

Advantageously, the apparatus and method of the present invention provides the benefit of decoding in-phase and quadrature components independently and separately. Since in-phase and quadrature component of 64/256-QAM TCM code can be decoded independently, the present invention reduces branch metric calculation and trellis complexity. In addition, the apparatus and method of the present invention can decode 64- or 256-QAM TCM signals. Furthermore, by providing a synchronization circuitry, the present invention allows adjustment in synchronizing a depuncturing and puncturing scheme. Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

Prior Art

Prior Art

Prior Art

Prior Art

Prior Art FIG. 3B illustrates a 256-QAM table that can be used to generate the X and Y values.

Prior Art FIG. 3C depicts a 256-QAM constellation mapping table.

FIG. 4A illustrates a block diagram of a 64/256 QAM TCM decoder in accordance with one embodiment of the present invention.

FIG. 4B illustrates a block diagram of the 64/256 QAM TCM decoder including a serial-to-parallel circuitry.

FIG. 5 illustrates a block diagram of an apparatus 500 for recovering information bits from a stream of QAM TCM signals.

DESCRIPTION OF THE PREFERRED EMBODIMENTS

Figure 1:
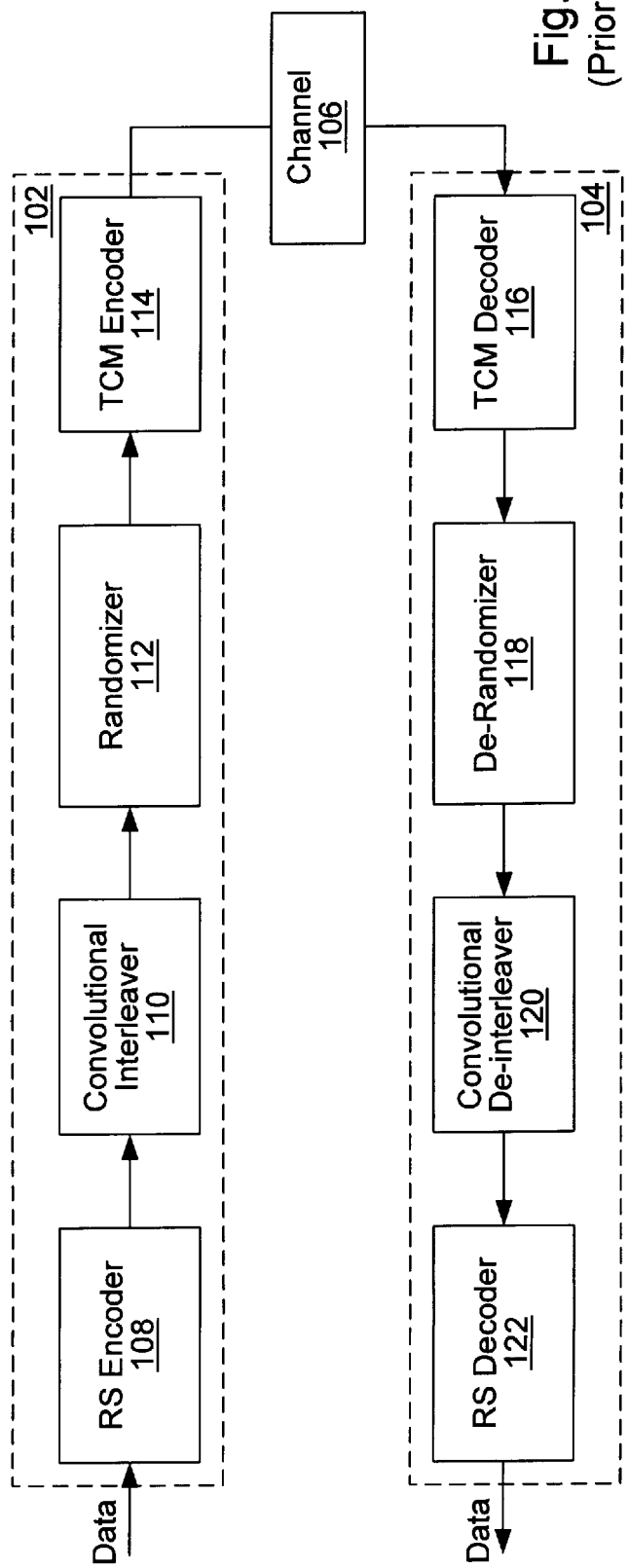
FIG. 1 illustrates a conventional cable modem transmission block diagram depicting a forward error correction scheme in accordance with standard of ITU-T Recommendation J-83 Annex B.
Figure 2A:
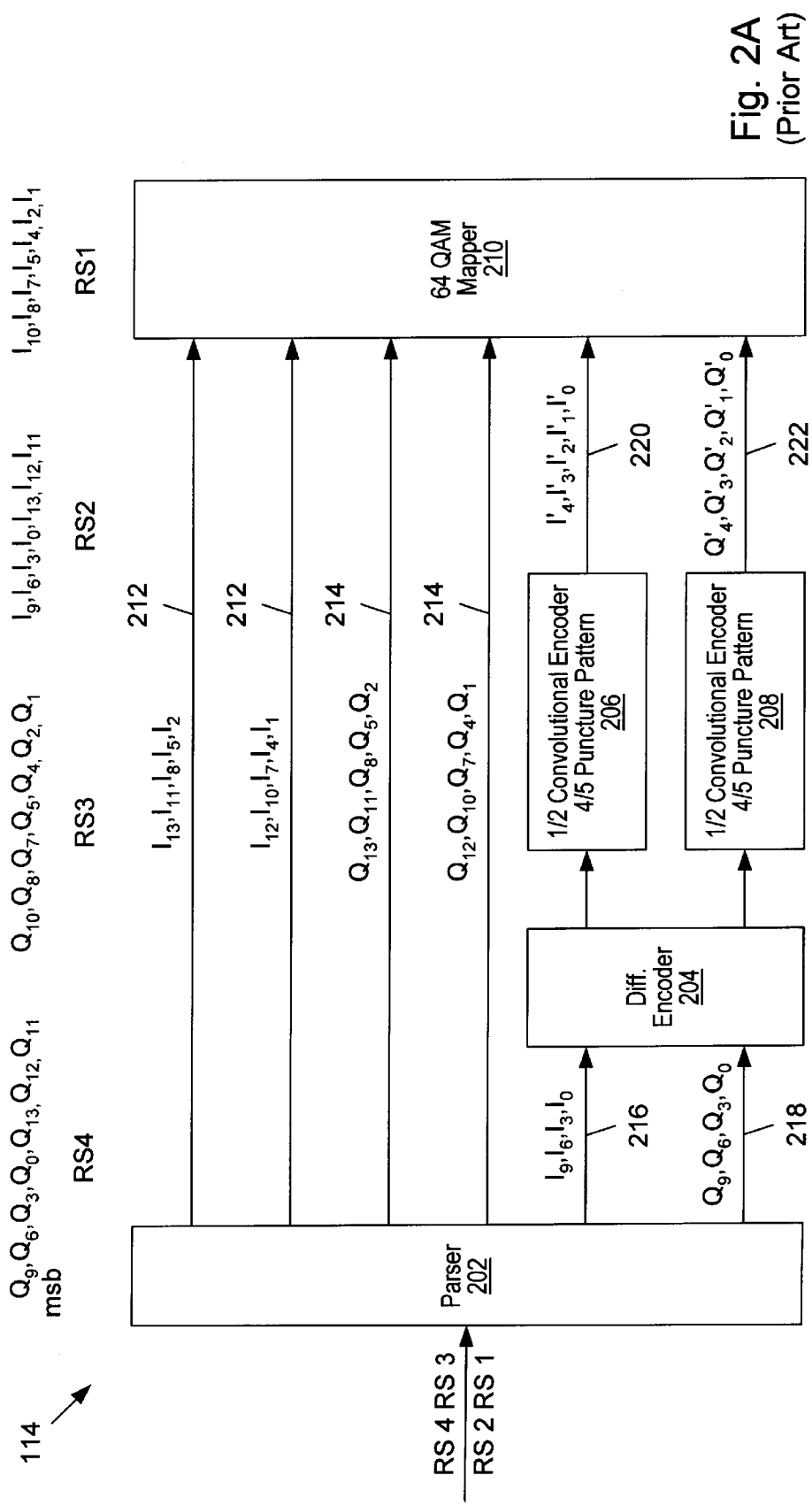
FIG. 2A illustrates a block diagram of a conventional TCM encoder.
Figure 2B:
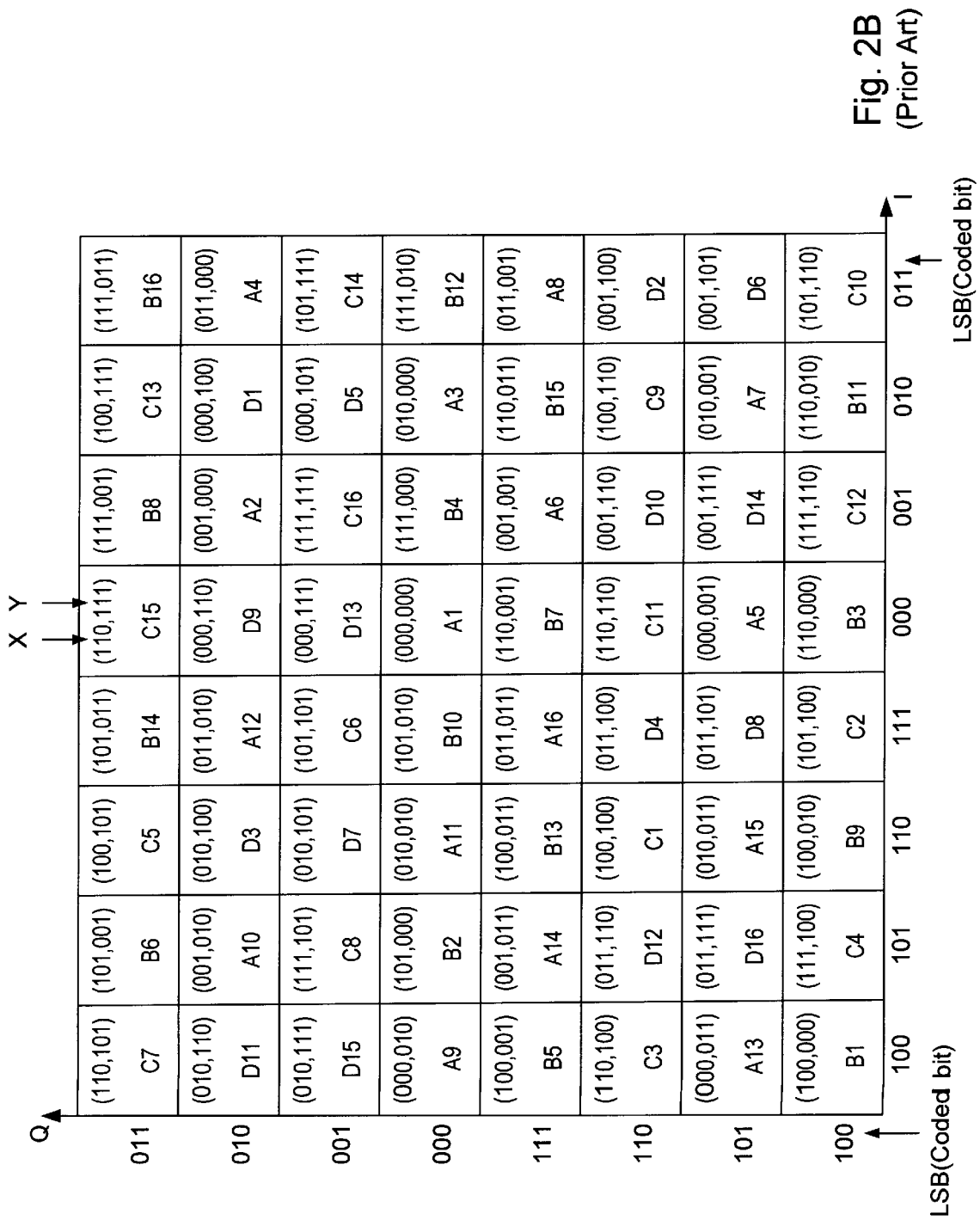
FIG. 2B illustrates a 64-QAM table that can be used to generate the X and Y values.
Figure 2C:
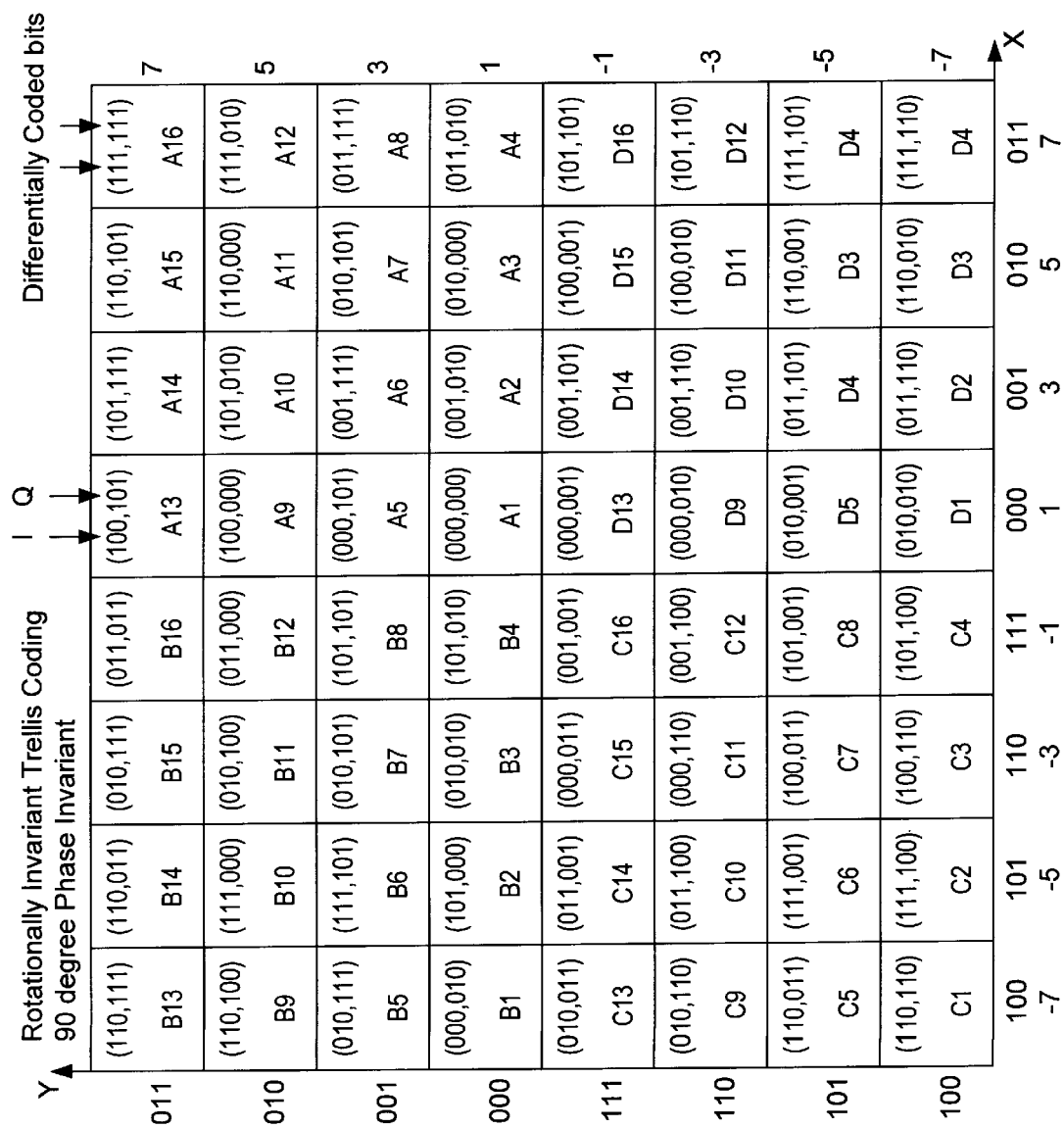
FIG. 2C depicts a 64-QAM constellation mapping table.
Figure 3A:
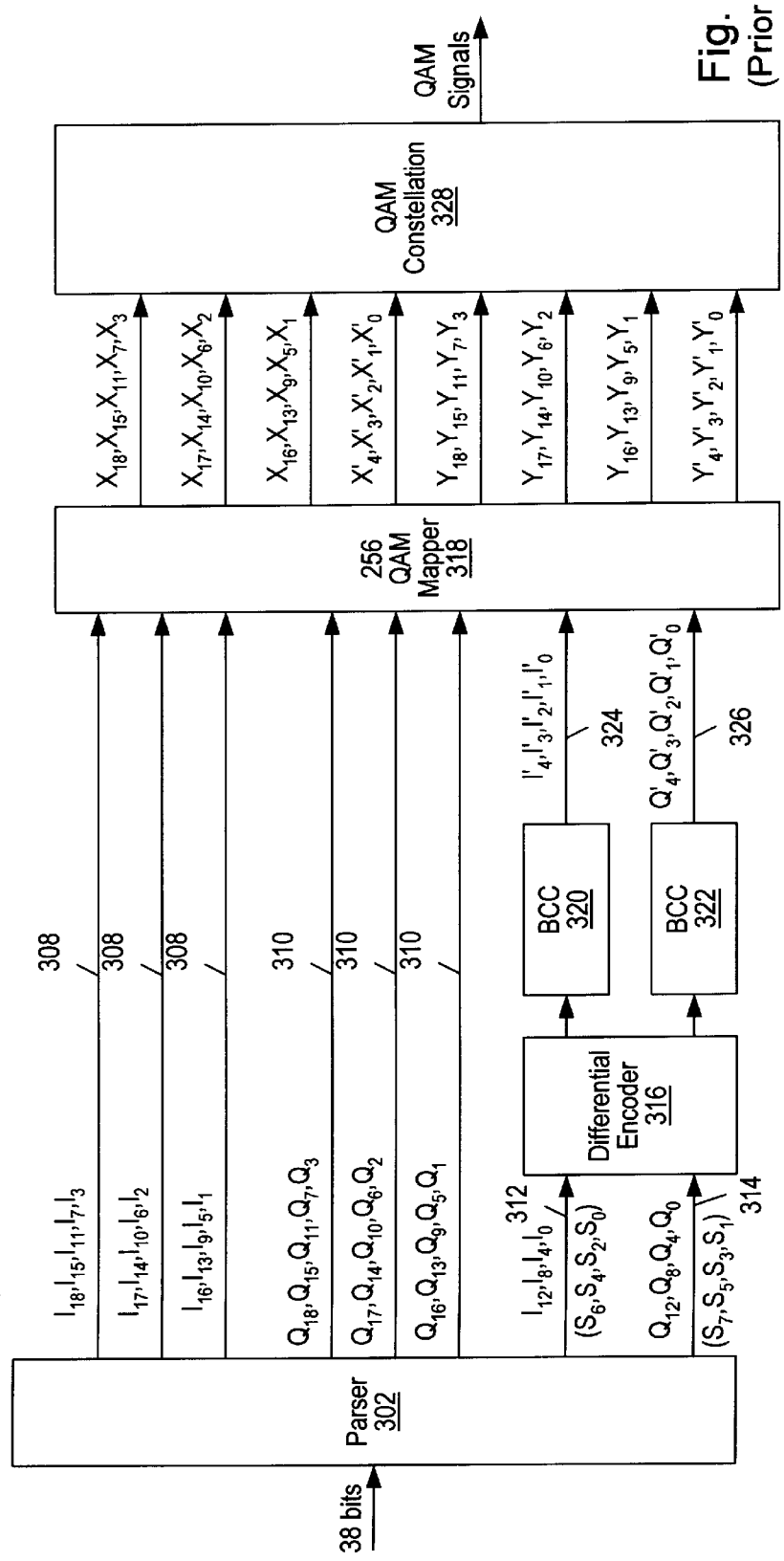
FIG. 3A illustrates a block diagram of a conventional 256-QAM TCM encoder.

In the following detailed description of the present invention, apparatus and method for recovering information bits from 64/256-QAM TCM decoder, numerous specific details are set forth in order to provide a thorough understanding of the present invention. However, it will be obvious to one skilled in the art that the present invention may be practiced without these specific details. In other instances, well known methods, procedures, components, and circuits have not been described in detail so as not to unnecessarily obscure aspects of the present invention.

The present invention provides apparatus and method for recovering information bits using 64/256-Quadrature Amplitude Modulation (QAM) Trellis Coded Modulation (TCM) decoder, which may be used in the concatenated decoding scheme of North American cable modem. FIG. 4A illustrates a block diagram of a 64/256 QAM TCM decoder 400 in accordance with one embodiment of the present invention. The 64 QAM TCM decoder 400 includes a 64/256 QAM demodulator 402, a depuncture circuitry 404, and a rate-½ Viterbi decoder 406. In this configuration, the 64/256-QAM demodulator 402 receives an analog 64- or 256-QAM signal stream through a cable network and determines whether the received signal is a 64- or 256-QAM signal. In the preferred embodiment, the 64/256-QAM demodulator generates a 1-bit indicator signal for indicating whether the received signal is a 64- or 256-QAM signal and transmits the QAM indicator signal to other parts of the circuitry such as the depuncture circuitry 404 and the Viterbi decoder 406.

In this configuration, the QAM demodulator 402 receives a stream of QAM signals and demodulates each of the received QAM signals into an in-phase component $X_I$ and a quadrature component $Y_Q$. The in-phase component $X_I$ includes five consecutive in-phase symbols (e.g., $X_0, X_1, X_2, X_3,$ and $X_4$). The quadrature component $Y_Q$ includes five consecutive quadrature symbols (e.g., $Y_0, Y_1, Y_2, Y_3,$ and $Y_4$).

The depuncture circuitry 404 receives the in-phase component $X_I$ and the quadrature component $Y_Q$ and generates a depunctured in-phase component $X_I'$ and a depunctured quadrature component $Y_Q'$. Preferably, the depuncture circuitry 404 depunctures $X_I$ and $Y_Q$ in accordance with a de-puncture matrix such as [P1,P2]=[0001:1111], where "0" indicates no transmission and "1" denotes transmission. Under the exemplary depuncturing scheme, the depuncture circuitry 407 generates the in-phase component $X_I'$ of [*, *, *, $X_0$: $X_4$, $X_3$, $X_2$, $X_1$] and the depuncture circuitry 408 produces the quadrature component $Y_Q'$ of [*, *, *, $Y_0$: $Y_4$, $Y_3$, $Y_2$, $Y_1$], wherein * denotes a dummy variable. The symbols in the in-phase component $X_I'$ and in the quadrature component $Y_Q'$ are transmitted pair wise in parallel. For example, the symbols $X_0$ and $X_1$ are transmitted to the Viterbi decoder 406 for simultaneous processing. Similarly, the symbols $Y_0$ and $Y_1$ are transmitted for processing by the Viterbi decoder 406.

In accordance with the de-puncture matrix, the depuncture circuitry 404 adds or inserts 3 dummy symbols (e.g., bits) to each of the received five bit $X_I$ and $Y_Q$ components and essentially converts the rate ⅕ soft output stream into rate ½ output stream. In this way, the in-phase and quadrature depuncture circuitry 407 and 408 generate a depunctured soft in-phase and quadrature outputs $X_I'$ and $Y_Q'$, respectively, for transmission to the Viterbi decoder 406.

The Viterbi decoder 406 includes an in-phase Viterbi decoder 412 and a quadrature Viterbi decoder 414. The in-phase Viterbi decoder receives the in-phase component $X_I'$ and generates a decoded in-phase (e.g., $I_{LSB}$) bit and uncoded bits or MSBs of the in-phase component (i.e., $X_{MSB}$). The quadrature Viterbi decoder receives the quadrature component $Y_Q'$ and generates a decoded quadrature (e.g., $Q_{LSB}$) bit and uncoded bits or MSBs of the quadrature component (i.e., $Y_{MSB}$) for each pair of symbols received. The Viterbi decoder 406 thus outputs in-phase component including $I_{LSB}$ and $X_{MSB}$ and quadrature component including $Q_{LSB}$ and $Y_{MSB}$.

FIG. 4B illustrates a block diagram of the 64/256 QAM TCM decoder 400 including a serial-to-parallel circuitry 420. The serial-to parallel circuitry 420 includes an in-phase serial-to-parallel circuitry 422 and a quadrature serial-to-parallel circuitry 424. The in-phase serial-to-parallel circuitry 422 is coupled to the in-phase depuncture circuitry 407 to receive in-phase symbols $X_I'$ for arranging the in-phase symbols from a serial into a parallel sequence for input into the in-phase Viterbi decoder 412. The quadrature serial-to-parallel circuitry 424 is coupled to the quadrature depuncture circuitry 408 to receive quadrature symbols $Y_Q'$ for arranging the quadrature symbols from a serial into a parallel sequence for input into the quadrature Viterbi decoder 414. Preferably, the in-phase and quadrature serial-to-parallel circuitry 422 and 424 take two consecutive serial symbols and transmit the two symbols simultaneously in parallel into the in-phase and quadrature Viterbi decoders 412 and 414, respectively.

The Viterbi decoder 406 receives the depunctured in-phase and quadrature components from the depuncture circuitry 404 in parallel and decodes the soft in-phase and quadrature data streams from the 64/256-QAM demodulator 402 separately and independently. In the preferred embodiment, the Viterbi decoder 406 includes an in-phase Viterbi decoder 412 for decoding the in-phase component and a quadrature Viterbi decoder 414 for decoding the quadrature component. Each of the Viterbi decoders 412 and 414 generates one coded information bit for convolutional code and 4 uncoded bits for 64-QAM signals or 6 uncoded bits for 256-QAM signals for the respective component of the data stream.

The Viterbi decoder 406 receives the indicator signal from the QAM demodulator 402, which indicates whether the received signals are 64- or 256-QAM modulated signals. In response to the indicator signal, the Viterbi decoder 406 decodes the received signals as either 64- or 256-QAM TCM signals. In particular, the Viterbi decoders 412 and 414 decodes the in-phase and quadrature components, respectively, of the received signals in accordance with the indicator signal.

The 64/256 QAM TCM decoder 400 thus generates eight consecutive 3-bit pairs for parallel branches and 4 information bits from 8 consecutive in-phase component of 256-QAM signals. The 64/256 QAM TCM decoder 400 is discussed and illustrated in detail in a co-pending U.S. patent application filed on an even date herewith and entitled "A 64/256 QUADRATURE AMPLITUDE MODULATION TRELLIS CODED MODULATION DECODER," by Dojun Rhee and Chanthachith Souvanthong, which is incorporated herein by reference in its entirety.

FIG. 5 illustrates a block diagram of an apparatus 500 for recovering information bits from a stream of QAM TCM signals. The apparatus includes a 64/256 QAM TCM decoder 400, a reencode and puncture circuitry 502, an inverse mapper 506, a synchronization circuitry 504, a recovery circuitry 508, and a delay unit 512. The 64/256 QAM TCM decoder 400 includes a QAM demodulator 402, a first-in-first-out (FIFO) buffer 510, a depuncture circuitry 404, and a Viterbi decoder 406. In the 64/256 QAM TCM decoder 400 configuration, the FIFO buffer 510 is adapted to provide an interface function between the demodulated in-phase and quadrature symbols and the depuncture circuitry 404.

In the 64/256 QAM TCM decoder 400 configuration, the QAM demodulator 402 receives a stream of QAM signals and demodulates each of the received QAM signals into an in-phase component $X_I$ and a quadrature component $Y_Q$. The in-phase component $X_I$ includes five consecutive in-phase symbols (e.g., $X_0$, $X_1$, $X_2$, $X_3$, and $X_4$). The quadrature component $Y_Q$ includes five consecutive quadrature symbols (e.g., $Y_0$, $Y_1$, $Y_2$, $Y_3$, and $Y_4$). The FIFO buffer 510 receives the serial in-phase component $X_I$ and the quadrature component $Y_Q$ and transmits $X_I$ and $Y_Q$ to the depuncture circuitry 404. The depuncture circuitry 404 receives the in-phase component $X_I$ and the quadrature component $Y_Q$ and generates a depunctured in-phase component $X_I'$ and a depunctured quadrature component $Y_Q'$.

The Viterbi decoder 406 generates a decoded in-phase (e.g., $I_{LSB}$) bit and a decoded quadrature (e.g., $Q_{LSB}$) bit for each pair of symbols fed into the Viterbi decoder 406. In addition, the Viterbi decoder 406 generates the uncoded bits or MSBs of the in-phase component (i.e., $X_{MSB}$) and the uncoded bits or MSBs of the quadrature component (i.e., $Y_{MSB}$). The Viterbi decoder 406 thus outputs in-phase component including $I_{LSB}$ and $X_{MSB}$ and quadrature component including $Q_{LSB}$ and $Y_{MSB}$.

The reencode and puncture circuitry 502 receives four consecutive outputs of the Viterbi decoder 406 in sequence and performs binary convolutional encoding on the four consecutive decoded in-phase ($I_{LSB}$) bits and the four consecutive decoded quadrature ($Q_{LSB}$) bits independently. The binary convolutional encoding essentially reencodes the four Viterbi decoded in-phase $I_{LSB}$ bits and four Viterbi quadrature $Q_{LSB}$ bits using, for example, the convolutional encoder 206, 208, 320, or 322 described above. The reencode and puncture circuitry 502 then punctures the reencoded $I_{LSB}$ and $Q_{LSB}$ bits together with the uncoded in-phase component $X_{MSB}$ and quadrature component $Y_{MSB}$. This puncturing is reverse of the depuncturing performed in the depuncture circuitry 404. In a preferred embodiment, the depuncture circuitry 404 transmits a puncturing synchronization signal to the reencode and puncture circuitry 502 through a delay buffer 512 for synchronizing the puncturing scheme with the depuncturing scheme of the depuncture circuitry 404.

For synchronization, the synchronization circuitry 504 is coupled to the reencode and puncture circuitry 502 to receive the X' and Y' components. In addition, the synchronization circuitry 504 is coupled to the FIFO 510 to receive soft $X_I$ and $Y_Q$ symbols for conversion into hard I' and Q' symbols. Then, the synchronization circuitry 504 compares the hard I' and Q' symbols with the X' and Y' symbols to determine equivalence. When the symbols are not same, an error signal is generated and the number of errors are accumulated. When the number of errors reaches a predetermined threshold value, the synchronization circuitry 504 transmits a synchronization signal to the depuncture circuitry 404 for resynchronizing the depuncturing scheme.

After reencoding and puncturing, the reencode and puncture circuitry 502 generates X' and Y' components of a signal. The inverse mapper 506 is coupled to the reencode and puncture circuitry 502 to receive the X' and Y' components. The inverse mapper 506 maps the received X' and Y' components onto an inverse mapping table using X' and Y' values as indices. The inverse mapper 506 then determines a digital signal bits described by I' and Q' components as (I', Q'), which corresponds to the (X', Y') components. The I' and Q' components are then transmitted to the recovery circuitry 508.

In addition to the digital bits (I', Q'), the recovery circuitry 508 receives the each of the four decoded in-phase ($I_{LSB}$) bits and the four decoded quadrature ($Q_{LSB}$) bits. The recovery circuitry 508 is configured to assemble or arrange the received input bits into original RS symbols. For 64-QAM signals, the recovery circuitry 508 generates 28 bits or 4 RS symbols. For 256-QAM signals, on the other hand, the recovery circuitry 508 generates 38 bits. In this manner, the recovery circuitry 508 essentially performs the reverse functions of the parser 202 and 302.

During the operation of the apparatus 500, it should be borne in mind that the QAM demodulator 402 generates a 64/256 QAM signal indicator for indicating whether the received signals are 64- or 256-QAM TCM signals. This signal indicator is transmitted to the FIFO buffer 510, the depuncture circuitry 404, the Viterbi decoder 406, the reencode and puncture circuitry 502, the inverse mapper 506, the recovery circuitry 508 and the synchronization circuitry 504. In addition, the depuncture circuitry 404 can generate a data valid bit, which may be transmitted to the Viterbi decoder 406, the reencode and puncture circuitry 502, the inverse mapper 506, the recovery circuitry 508, and the synchronization circuitry 504. The data valid bit is used to indicate whether the depunctured symbols generated by the depuncture circuitry 404 are valid or not.

Figure 6:
FIG. 6 illustrates an exemplary inverse mapping table for mapping (X', Y') values into (I', Q') values.

As mentioned previously, the inverse mapper 506 maps the X' and Y' components as indices onto an inverse mapping table to determine corresponding (I', Q') symbol signals. The inverse mapper 506 is well known in the art and typically includes a memory unit that stores the values of the inverse mapping table. FIG. 6 illustrates an exemplary inverse mapping table 600 for mapping (X', Y') values into (I', Q') values.

Each of the elements in the apparatus 500 receives the indicator signal from the QAM demodulator 402, which indicates whether the received signals are 64- or 256-QAM modulated signals. In response to the indicator signal, the elements in the apparatus 500 the received signals as either 64- or 256-QAM TCM signals. For example, the Viterbi decoder 406, depuncture circuitry 404, reencode and puncture circuitry 502, inverse mapper 506, recovery circuitry 508, and the synchronization circuitry 504 process the in-phase and quadrature components of the received signals in accordance with the indicator signal from the QAM demodulator 402.

Figure 7:
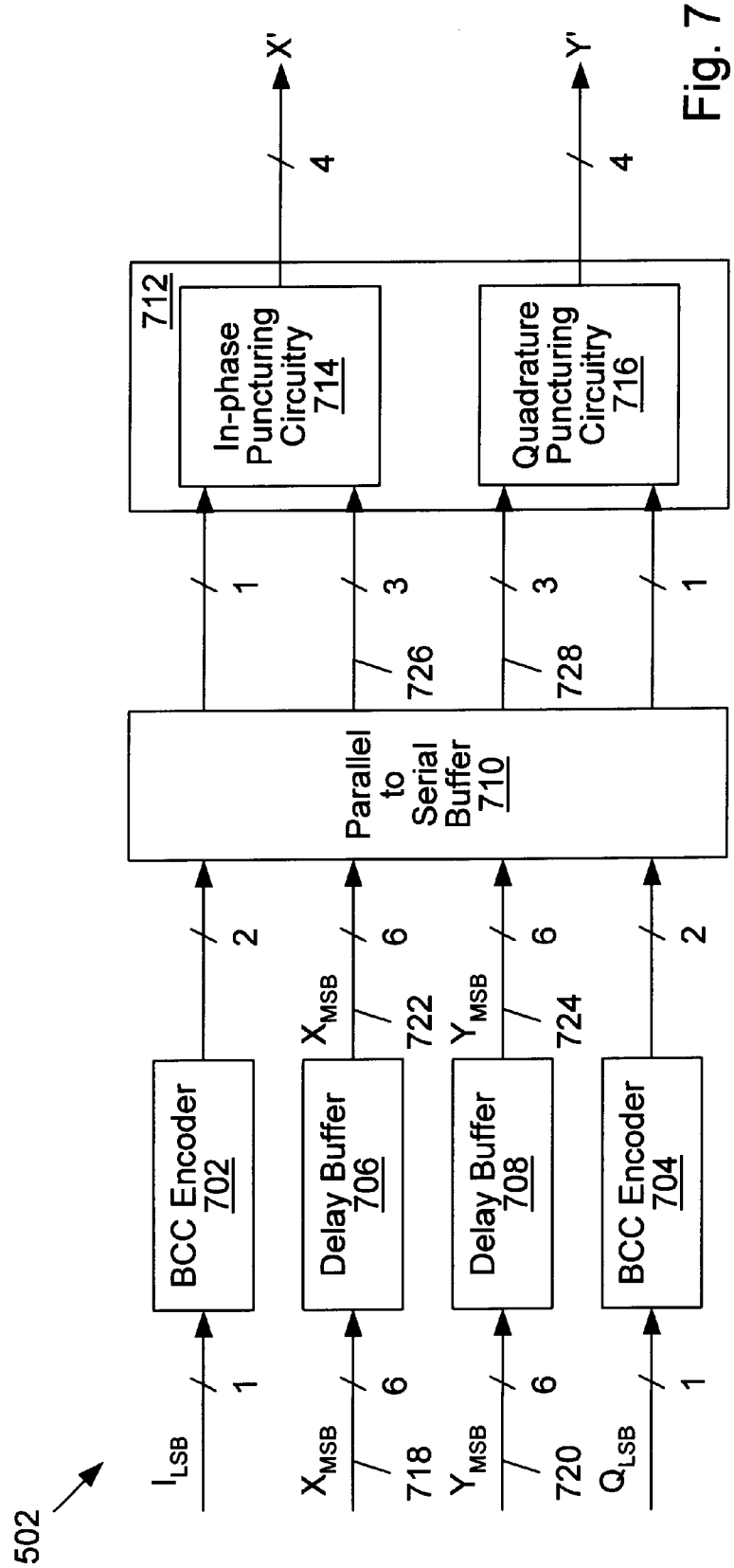
FIG. 7 illustrates a more detailed block diagram of the reencode and puncture circuitry in accordance with one embodiment of the present invention.

FIG. 7 illustrates a more detailed block diagram of the reencode and puncture circuitry 502 in accordance with one embodiment of the present invention. The reencode and puncture circuitry 502 includes a pair of binary convolutional code (BCC) encoders 702 and 704, a pair of delay buffers 706 and 708, a parallel-to-serial buffer 710, and a puncturing circuitry 712. The puncturing circuitry 712 includes an in-phase puncturing circuitry 714 and a quadrature puncturing circuitry 716.

With continuing reference to FIG. 7, the BCC encoders 702 and 704 receive, for encoding, a decoded in-phase ($I_{LSB}$) bit and a decoded quadrature ($Q_{LSB}$) bit, respectively, from the Viterbi decoder 406. The BCC encoders 702 and 704 reencodes the $I_{LSB}$ and $Q_{LSB}$ bits for subsequent puncturing. The ½ rate BCC encoders 702 and 704 generate 8 output bits each from the four consecutive input bits, $I_{LSB}$ and $Q_{LSB}$ bits, respectively. The BCC encoders 702 and 704 preferably implements the same convolutional encoding scheme of the conventional binary convolutional encoder of 206, 208, 320, and 322. The 2-bit outputs of the BCC encoders are transmitted in parallel to the parallel-to-serial buffer 710, which readies the data bits for puncturing.

The delay buffers 706 and 708 receive the uncoded in-phase and quadrature components $X_{MSB}$ and $Y_{MSB}$, respectively. The number of $X_{MSB}$ and $Y_{MSB}$ bits differs depending on whether the received signals are 64- or 256-QAM TCM signals. For example, when the received signals are 64-QAM TCM signals, the number of $X_{MSB}$ and $Y_{MSB}$ bits are 4 bits each. On the other hand, when the received signals are 256-QAM TCM signals, the number of $X_{MSB}$ and $Y_{MSB}$ bits are 6 bits each. The delay buffers 706 and 708 provide a delay for synchronizing the subsequent puncturing with associated $I_{LSB}$ and $Q_{LSB}$ bits.

After an appropriate delay required for the synchronization, the uncoded in-phase and quadrature components $X_{MSB}$ and $Y_{MSB}$, respectively, are transmitted to the parallel-to-serial buffer 710. In the preferred embodiment, the present invention utilizes 6 lines 720 and 724 for transmitting $X_{MSB}$ and 6 lines 720 and 724 to transmit $Y_{MSB}$. Based on the signal selected by the signal indicator, the reencode and puncture circuitry 502 utilizes all 6 lines for 256-QAM signals or 4 lines for 256-QAM signals.

The parallel-to-serial buffer 710 is configured to serialize the incoming data for input to the puncturing circuitry 712. Specifically, the parallel-to-serial buffer 710 serializes each of the two parallel input bits of $I_{LSB}$ and $Q_{LSB}$ bits into two serial bits, which are then transmitted serially to the puncturing circuitry 712. On the other hand, the parallel-to-serial buffer 710 converts the uncoded in-phase $X_{MSB}$ bits and the uncoded quadrature $Y_{MSB}$ bits into one-half of the original width for input to the puncturing circuitry 712. Specifically, the parallel-to-serial buffer 710 employs a pair of three-lines 726 and 728 to transmit half of the uncoded in-phase $X_{MSB}$ and the $Y_{MSB}$, respectively to the puncturing circuitry 712. Using these three-line pairs 726 and 728, the parallel-to-serial buffer 710 transmits 3 bits each over lines 726 and 728 for a 256-QAM TCM signal case and 2 bits each over lines 726 and 728 by disabling or ignoring one line for a 64-QAM TCM signal case.

The puncturing circuitry 712 includes the in-phase puncturing circuitry 714 for puncturing the in-phase component ($I_{LSB}$ and $X_{MSB}$ bits) and the quadrature puncturing circuitry 716 for puncturing the quadrature component ($Q_{LSB}$ and $Y_{MSB}$ bits). This puncturing scheme is a reverse process of the depuncturing performed in the depuncture circuitry 404 and is well known in the art. In a preferred embodiment, the puncturing circuitry 712 receives the puncturing synchronization signal from the depuncture circuitry 404 for synchronizing the puncturing scheme with the depuncturing scheme of the depuncture circuitry 404. The in-phase puncturing circuitry 714 thus generates punctured in-phase component X' of 4 bits for 256-QAM TCM signals or 3 bits for 64-QAM TCM signals and the quadrature puncturing circuitry 716 produces punctured quadrature component Y' of 4 bits for 256-QAM TCM signals or 3 bits for 64-QAM TCM signals. These components X' and Y' are then transmitted to the inverse mapper 506 and the synchronization circuitry 504 for further processing.

Figure 8:
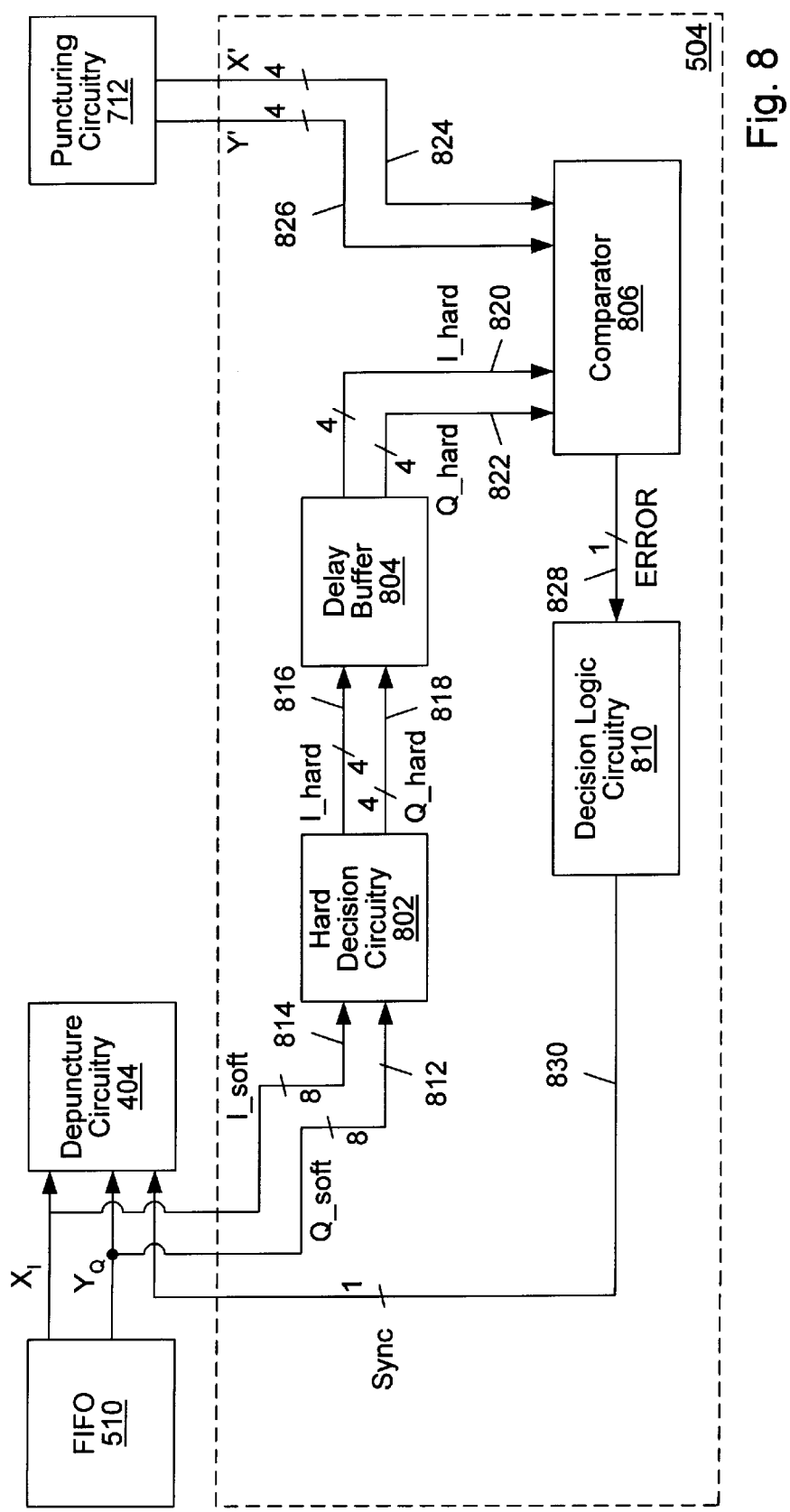
FIG. 8 illustrates a more detailed block diagram of the synchronization circuitry in accordance with one embodiment of the present invention.

FIG. 8 illustrates a more detailed block diagram of the synchronization circuitry 504 in accordance with one embodiment of the present invention. The synchronization circuitry 504 includes a hard decision circuitry 802, a delay buffer 804, a comparator 806, and a decision logic circuitry 810. The synchronization circuitry 504 generates and transmits a synchronization signal to the depuncture circuitry 404 for resynchronizing its depuncturing sequence. In this configuration, the hard decision circuitry 802 receives an 8-bit soft in-phase symbol I_soft (e.g., $X_I'$) over eight lines 814 and an 8-bit soft quadrature symbol Q_soft (e.g., $Y_Q'$) over eight lines 812 from the FIFO 510. The hard decision circuitry 802 essentially converts the 8-bit soft symbols to 4-bit hard symbols. For 256-QAM symbols, the hard decision circuitry 802 converts from the 8-bits soft symbols ϵ[0 to 255] to 4-bit hard symbols ϵ{-15, -13, -11, -9, -7, -5, -3, -1, 1, 3, 5, 7, 9, 11, 13, 15}, which correspond to {1000, 1001, 1010, 1011, 1100, 1101, 1110, 1111, 0000, 0001, 0010, 0011, 0100, 0101, 0110, 0111}. On the other hand, for 64-QAM symbols, the hard decision circuitry 802 converts the 8-bit soft symbols ϵ[0 to 255] to 3-bit symbols ϵ{-7, -5, -3, -1, 1, 3, 5, 7}, which corresponds to {100, 101, 110, 111, 000, 001, 010, 011}. The hard decision circuitry 802 is well known in the art.

After the conversion, the hard decision circuitry 802 generates a 3-(for 64-QAM signals) or 4-bit (for 256-QAM signals) hard in-phase component I_hard over four lines 816. Simultaneously, the hard decision circuitry 802 produces a 3-(for 64-QAM signals) or 4-bit (for 256-QAM signals) hard quadrature component Q_hard over four lines 818. It should be borne in mind that when 3-bit signals are generated for 64-QAM signals, one of the four lines 816 and 818 are not used. The delay buffer 804 receives the I_hard and Q_hard signals and provides appropriate delay for input into the comparator 806 over lines 820 and 822, respectively.

The comparator 806 receives the hard in-phase component I_hard signals over lines 820 and the hard quadrature component Q_hard signals over lines 822. At about the same time, the comparator receives the in-phase component X' and the quadrature component Y' from the puncturing circuitry 712 over four lines 824 and 826, respectively. As mentioned previously, for 64-QAM signals, only three bit X' and Y' signals are generated and one of the four lines 824 and 826 are not utilized.

Upon receiving the input signals, the comparator 806 compares the signals from the puncturing circuitry 712 and the hard decision circuitry 802 to determine whether the signals are the same signals. If the signals are not the same signals, the comparator 806 generates an error signal, ERROR, and transmits it to the coupled decision logic circuitry 810 over line 828. If, on the other hand, the signals are the same, the error signal, ERROR, is not asserted.

The decision logic circuitry 810 is coupled to the comparator 806 to receive the error signal, ERROR, over line 828. Each time the comparator 806 generates or asserts the error signal, ERROR, over line 828, the decision logic circuitry 810 counts and accumulates the number of detected errors. When the number of errors exceeds a predetermined threshold number, the decision logic circuitry 810 generates a synchronization signal, SYNC, for transmission to the depuncture circuitry 404 over line 830. Thus transmitted synchronization signal, SYNC, synchronizes the depuncturing scheme of the depuncture circuitry 404 to another depuncturing sequence.

Figure 9:
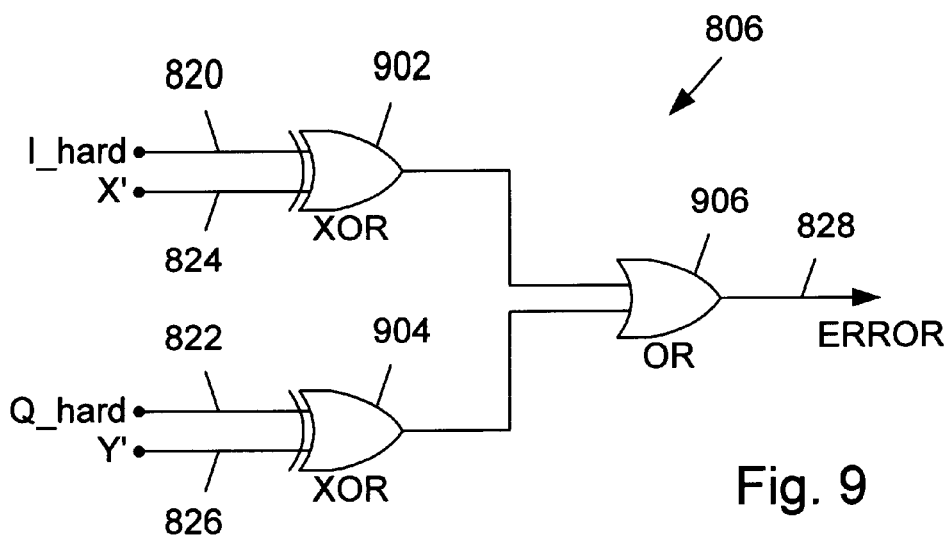
FIG. 9 illustrates a more detailed diagram of the comparator in accordance with one embodiment of the present invention.

FIG. 9 illustrates a more detailed diagram of the comparator 806 in accordance with one embodiment of the present invention. The comparator 806 includes a pair of XOR gates 902 and 904, and an OR gate 906. The XOR gate 902 receives the hard in-phase signal I_hard over lines 820 and the in-phase component X' over lines 824. On the other hand the XOR gate 904 receives the hard quadrature signal Q_hard over lines 822 and the quadrature component Y' over lines 826. The XOR gates 902 and 904 then performs XOR operations on their respective inputs. The resulting output of the XOR gates 902 and 904 are then input into the OR gate 906. Based on the inputs from the XOR gates 902 and 904, the OR gate generates the error signal, ERROR, for transmission over line 828.

Figure 10:
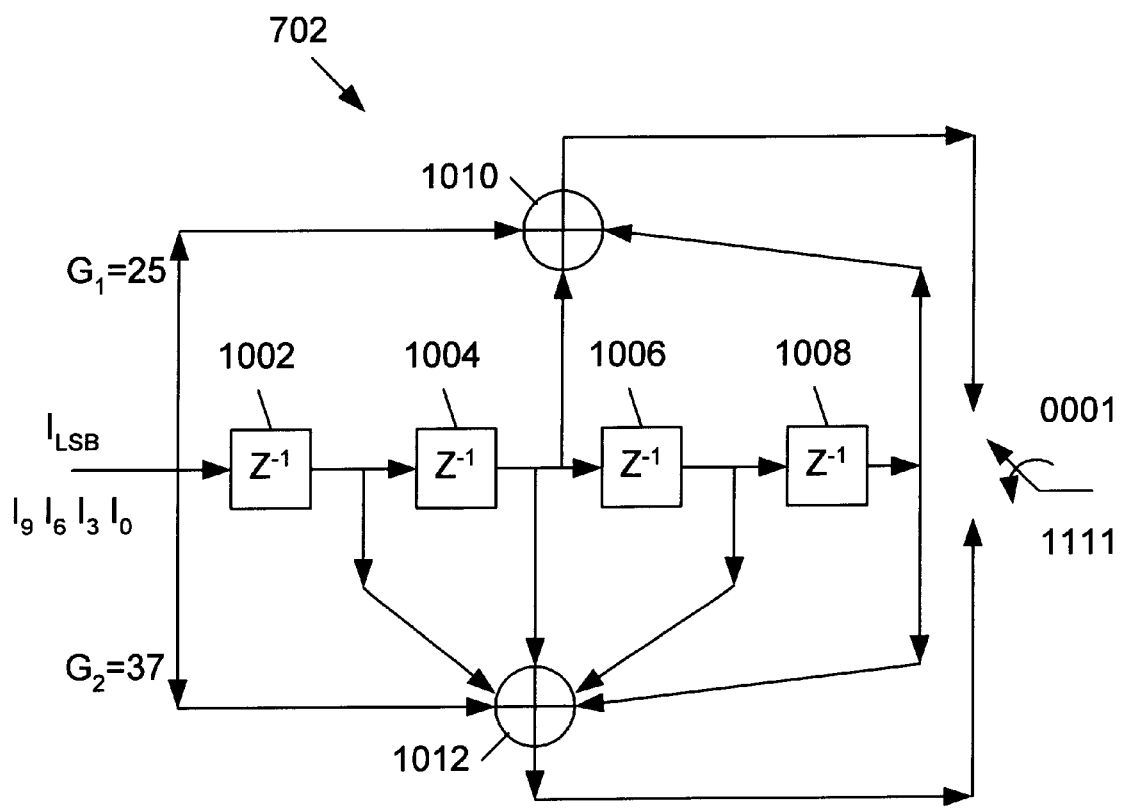
FIG. 10 illustrates a more detailed schematic diagram of the BCC encoder.

FIG. 10 illustrates a more detailed schematic diagram of the BCC encoder 702. It should be appreciated that the BCC encoder 704 can also be implemented using the BCC encoder 702. The BCC encoder 702 includes a pair of modulo-2 adders 1010 and 1012 and four shift registers 1002, 1004, 1006, and 1008 for storing input data bits. The BCC encoder 702 receives four consecutive decoded in-phase ($I_{LSB}$) bits in serial (e.g., $I_0$, $I_3$, $I_6$, and $I_9$) from the Viterbi decoder 406. The BCC encoder 702 reencodes the $I_{LSB}$ bits for subsequent puncturing. The BCC encoder 702 is a 16-state non-systematic ½ rate encoder with the generator: G1=010 101 and G2=011 111 (25, 37) octal. This generator is equivalent to the generator matrix [$1 \oplus D^2 \oplus D^4$, $1 \oplus D \oplus D^2 \oplus D^3 \oplus D^4$], where D represents a delay element "$Z^{-1}$." The ½ rate BCC encoder 702 generates 8 output bits each from the four consecutive input bits, $I_{LSB}$ and $Q_{LSB}$ bits, respectively.

Advantageously, the apparatus and method of the present invention provides the benefit of decoding in-phase and quadrature components independently and separately. Since in-phase and quadrature component of 64/256-QAM TCM code can be decoded independently, the present invention reduces branch metric calculation and trellis complexity. In addition, the apparatus and method of the present invention can decode 64- or 256-QAM TCM signals. Furthermore, by providing a synchronization circuitry, the present invention allows adjustment in synchronizing a depuncturing and puncturing scheme.

While the present invention has been described in terms of several preferred embodiments, there are alterations, permutations, and equivalents which fall within the scope of this invention. It should also be noted that there are alternative ways of implementing both the method and apparatus of the present invention. It is therefore intended that the following appended claims be interpreted as including all such alterations, permutations, and equivalents as fall within the true spirit and scope of the present invention.

What is claimed is:

1. An apparatus for recovering information bits from in-phase and quadrature components of a stream of quadrature amplitude modulation (QAM) trellis code modulation (TCM) signals, each signal having an in-phase component and a quadrature component, wherein the in-phase component includes a decoded bit and a plurality of uncoded in-phase bits and the quadrature component includes a decoded quadrature bit and a plurality of uncoded quadrature bits, the apparatus comprising:

a reencode and puncture circuitry adapted to receive the in-phase and quadrature components of a QAM TCM signal for encoding the decoded in-phase and quadrature bits, wherein the reencode and puncture circuitry punctures the encoded in-phase bit with the uncoded in-phase bits to generate an in-phase component index and wherein the reencode and puncture circuitry punctures the encoded quadrature bit with the remaining quadrature bits to generate a quadrature component index;

an inverse mapping circuitry coupled to the reencode and puncture circuitry to receive the in-phase component index and the quadrature component index for recovering a first set of in-phase bits and a second set of quadrature bits; and a recovery circuitry coupled to the inverse mapping circuitry to receive the first set of in-phase bits and the second set of quadrature bits, the recovery circuitry being coupled to receive the decoded in-phase and quadrature bits, wherein the recovery circuitry recovers a set of information bits by assembling the received bits.

2. The apparatus as recited in claim 1, wherein the apparatus is used in a cable modem.

3. The apparatus as recited in claim 1, wherein the decoded bit in each of the in-phase and quadrature components is a least significant bit.

4. The apparatus as recited in claim 3, wherein the apparatus is capable of recovering the set of information bits from either 64- or 256-QAM TCM signals.

5. The apparatus as recited in claim 4, further comprising:

a QAM TCM decoder for receiving the stream of QAM TCM signals and generating the in-phase component and the quadrature component for each of the received signals, wherein the QAM TCM decoder is coupled to the reencode and puncture circuitry to transmit the in-phase component and the quadrature component.

6. The apparatus as recited in claim 5, wherein the QAM TCM decoder includes a QAM demodulator for generating an indicator signal that indicates whether the received QAM TCM signals are 64- or 256-QAM TCM signals.

7. The apparatus as recited in claim 6, wherein the reencode and puncture circuitry, the inverse mapping circuitry, and the recovery circuitry receives the indicator signal for processing the 64- or 256-QAM TCM signals in accordance with the indicator signal.

8. The apparatus as recited in claim 1, wherein the reencode and puncture circuitry comprises:

an encoder circuitry adapted to receive the decoded in-phase and quadrature bits for encoding the decoded in-phase and quadrature bits;

a delay circuitry adapted to receive the plurality of uncoded in-phase and quadrature bits to provide a delay in transmitting the uncoded in-phase and quadrature bits so as to synchronize the puncturing of the uncoded in-phase and quadrature bits with the encoded in-phase and quadrature bits, respectively;

a parallel-to-serial buffer coupled to receive and convert the order of the encoded in-phase and quadrature bits and the uncoded in-phase and quadrature bits from a parallel sequence to a serial sequence for the puncturing of the in-phase and quadrature components; and a puncturing circuitry coupled to receive the serialized in-phase and quadrature components from the parallel-to-serial buffer for puncturing the in-phase and quadrature components.

9. The apparatus as recited in claim 8, wherein the delay circuitry includes:

a first delay buffer adapted to receive the plurality of uncoded in-phase bits for providing the delay; and a second delay buffer adapted to receive the plurality of uncoded quadrature bits for providing the delay.

10. The apparatus as recited in claim 8, wherein the puncturing circuitry includes:

an in-phase puncturing circuitry configured to puncture the serialized in-phase component for generating the in-phase component index; and a quadrature puncturing circuitry configured to puncture the serialized quadrature component for generating the quadrature component index.

11. The apparatus as recited in claim 8, wherein the encoder circuitry includes:

an in-phase encoder adapted to receive the decoded in-phase bit for convolutionally encoding the decoded in-phase bit; and a quadrature encoder adapted to receive the decode quadrature bit for convolutionally encoding the decoded quadrature bit.

12. The apparatus as recited in claim 11, wherein the in-phase and quadrature encoders are binary convolutional encoders.

13. The apparatus as recited in claim 8 further comprising:

a synchronization circuitry coupled between the QAM TCM decoder and the reencode and puncture circuitry for synchronizing the QAM TCM decoder.

14. The apparatus as recited in claim 13, wherein the synchronization circuitry includes:

a hard decision circuitry coupled to the QAM TCM decoder to receive a soft in-phase component and a soft quadrature component of the QAM TCM signal for generating a corresponding hard in-phase component and a corresponding hard quadrature component, respectively;

a comparator coupled to the hard decision circuitry to receive the hard in-phase component and the hard quadrature component, the comparator being coupled to the reencode and puncture circuitry to receive the in-phase component index and the quadrature component index, wherein the comparator compares the hard in-phase component with the in-phase component index and the hard quadrature component with the quadrature component index to generate an error signal when the components are not equal; and a decision logic circuitry coupled to receive the error signal from the comparator for accumulating the number of error signals received and for generating a synchronization signal for synchronizing the QAM TCM decoder when the number of error signals exceed a predetermined number.

15. The apparatus as recited in claim 14, wherein the synchronization circuitry further includes a third delay buffer coupled between the hard decision circuitry and the comparator for providing a delay of the hard in-phase component and the hard quadrature component into the comparator.

16. A method for recovering information bits from in-phase and quadrature components of a stream of quadrature amplitude modulation (QAM) trellis code modulation (TCM) signals, each signal having an in-phase component and a quadrature component, wherein the in-phase component includes a decoded bit and a plurality of uncoded in-phase bits and the quadrature component includes a decoded quadrature bit and a plurality of uncoded quadrature bits, the method comprising:

receiving the in-phase and quadrature components of a QAM TCM signal;

encoding the decoded in-phase and quadrature bits of the in-phase and quadrature components, respectively;

puncturing the encoded in-phase bit with the uncoded in-phase bits to generate an in-phase component index and puncturing the encoded quadrature bit with the remaining quadrature bits to generate a quadrature component index;

recovering a first set of in-phase bits and a second set of quadrature bits using the in-phase component index and the quadrature component index; and recovering a set of information bits by assembling the first set of in-phase bits, the second set of quadrature bits, and the decoded in-phase and quadrature bits.

17. The method as recited in claim 16, wherein the first set of in-phase bits and the second set of quadrature bits are recovered by mapping the in-phase and quadrature component indices onto an inverse table.

18. The method as recited in claim 17, wherein the decoded bit in each of the in-phase and quadrature components is a least significant bit.

19. The method as recited in claim 18, wherein the set of information bits are recovered from either 64- or 256-QAM TCM signals.

20. The method as recited in claim 19, wherein the receiving the in-phase and quadrature components of the QAM TCM signal further comprises:

receiving the stream of QAM TCM signals; and generating the in-phase component and the quadrature component for each of the received signals.

21. The method as recited in claim 20 further comprising: synchronizing the generation of the in-phase component and the quadrature component with the puncturing.

22. The method as recited in claim 21, wherein the synchronization comprises:

generating a soft in-phase component and a soft quadrature component of the QAM TCM signal;

generating a hard in-phase component and a hard quadrature component from the soft in-phase component and the soft quadrature component, respectively;

receiving the in-phase and quadrature component indices;

receiving the hard in-phase component and the hard quadrature component;

comparing the hard in-phase component with the in-phase component index and the hard quadrature component with the quadrature component index;

generating an error signal when the compared components are not equal; and accumulating the number of error signals; and generating a synchronization signal for synchronizing the generation of the in-phase component and the quadrature component with the puncturing when the accumulated number of error signals exceeds a predetermined number.

23. The method as recited in claim 20, wherein the receiving the in-phase and quadrature components of the QAM TCM signal further comprises:

generating an indicator signal that indicates whether the received QAM TCM signals are 64- or 256-QAM TCM signals.

24. The method as recited in claim 23, wherein the method processes the received 64- or 256-QAM TCM signals in accordance with the indicator signal.

25. The method as recited in claim 24, wherein the encoding the decoded in-phase and quadrature bits comprises:

receiving the decoded in-phase and quadrature bits of the in-phase and quadrature components, respectively; and encoding the decoded in-phase and quadrature bits.

26. The method as recited in claim 25, wherein the puncturing comprises:

receiving the plurality of uncoded in-phase and quadrature bits;

providing a delay for the uncoded in-phase and quadrature bits for synchronizing the puncturing of the uncoded in-phase and quadrature bits with the encoded in-phase and quadrature bits, respectively;

converting the order of the encoded in-phase and quadrature bits and the uncoded higher in-phase and quadrature bits from a parallel sequence to a serial sequence for the puncturing of the in-phase and quadrature components; and receiving the serialized in-phase and quadrature components from the parallel-to-serial buffer; and puncturing the in-phase and quadrature components for generating the in-phase and quadrature component indices.

27. The method as recited in claim 26, wherein the encoding the decoded in-phase and quadrature bits comprises:

convolutionally encoding the decoded in-phase bit; and convolutionally encoding the decoded quadrature bit.

28. The method as recited in claim 27, wherein the decoded in-phase and quadrature bits are encoded using a binary convolutional coding scheme.

29. An apparatus for recovering information bits from in-phase and quadrature components of a stream of quadrature amplitude modulation (QAM) trellis code modulation (TCM) signals, each signal having an in-phase component and a quadrature component, wherein the in-phase component includes a decoded bit and a plurality of uncoded in-phase bits and the quadrature component includes a decoded quadrature bit and a plurality of uncoded quadrature bits, the apparatus comprising:

a reencoding and puncturing means for encoding the decoded in-phase and quadrature bits, wherein the reencode and puncture means punctures the encoded in-phase bit with the uncoded in-phase bits to generate an in-phase component index and wherein the reencode and puncture means punctures the encoded least significant quadrature bit with the remaining quadrature bits to generate a quadrature component index;

a mapping means for recovering a first set of in-phase bits and a second set of quadrature bits from the in-phase component index and the quadrature component index, respectively; and a recovering means for recovering a set of information bits by assembling the first set of in-phase bits and the second set of quadrature bits and the decoded in-phase and quadrature bits.

30. The apparatus as recited in claim 29, wherein the apparatus is used in a cable modem.

31. The apparatus as recited in claim 29, wherein the decoded bit in each of the in-phase and quadrature components is a least significant bit.

32. The apparatus as recited in claim 31, wherein the apparatus is capable of recovering the set of information bits from either 64- or 256-QAM TCM signals.

33. The apparatus as recited in claim 32, further comprising:

a QAM TCM decoding means for receiving the stream of QAM TCM signals and generating the in-phase component and the quadrature component for each of the received signals, wherein the QAM TCM decoding means transmits the in-phase component and the quadrature component to the reencoding and puncturing means.

34. The apparatus as recited in claim 33, wherein the QAM TCM decoding means includes a QAM demodulating means for generating an indicator signal that indicates whether the received QAM TCM signals are 64- or 256-QAM TCM signals.

35. The apparatus as recited in claim 34, wherein the reencoding and puncturing means, the mapping means, and the recovering means receives the indicator signal for processing the 64- or 256-QAM TCM signals in accordance with the indicator signal.

36. The apparatus as recited in claim 35, wherein the reencoding and puncturing means comprises:

an encoding means for encoding the decoded in-phase and quadrature bits;

a delaying means for providing a delay in transmitting the uncoded in-phase and quadrature bits so as to synchronize the puncturing of the uncoded in-phase and quadrature bits with the encoded in-phase and quadrature bits, respectively;

a parallel-to-serial buffering means for converting the order of the encoded in-phase and quadrature bits and the uncoded in-phase and quadrature bits from a parallel sequence to a serial sequence for the puncturing of the in-phase and quadrature components; and a puncturing means for puncturing the serialized in-phase and quadrature components.

37. The apparatus as recited in claim 36, wherein the encoder means includes:

an in-phase encoding means for convolutionally encoding the decoded in-phase bit; and a quadrature encoding means for convolutionally encoding the decoded quadrature bit.

38. The apparatus as recited in claim 37, wherein the in-phase encoding means and quadrature encoding means are binary convolutional encoders.

39. The apparatus as recited in claim 37, wherein the delaying means includes:

a first buffer means for providing the delay for the uncoded in-phase bits; and a second buffer means for providing the delay for the uncoded quadrature bits.

40. The apparatus as recited in claim 37, wherein the puncturing means includes:

an in-phase puncturing means for puncturing the serialized in-phase component for generating the in-phase component index; and a quadrature puncturing means for puncturing the serialized quadrature component for generating the quadrature component index.

41. The apparatus as recited in claim 37 further including a synchronization means for synchronizing the QAM TCM decoding means.

42. The apparatus as recited in claim 40, wherein the synchronization means includes:

a hard decision means coupled to the QAM TCM decoding means to receive a soft in-phase component and a soft quadrature component of the QAM TCM signal for generating a corresponding hard in-phase component and a corresponding hard quadrature component, respectively;

a comparator for comparing the hard in-phase component with the in-phase component index and for comparing the hard quadrature component with the quadrature component index, wherein the comparator generates an error signal when the compared components are not equal; and a decision logic means for accumulating the number of error signals and for generating a synchronization signal for synchronizing the QAM TCM decoder when the number of error signals exceed a predetermined number.

43. The apparatus as recited in claim 42, wherein the synchronization means further includes a third buffer means for providing a transmission delay of the hard in-phase component and the hard quadrature component into the comparator.

* * * * *